US011721132B1

(12) United States Patent
Li et al.

(10) Patent No.: US 11,721,132 B1
(45) Date of Patent: Aug. 8, 2023

(54) SYSTEM AND METHOD FOR GENERATING REGION OF INTERESTS FOR PALM LIVENESS DETECTION

(71) Applicant: Armatura LLC, Alpharetta, GA (US)

(72) Inventors: Zhinong Li, Alpharetta, GA (US); Xiaowu Zhang, Alpharetta, GA (US)

(73) Assignee: ARMATURA LLC, Alpharetta, GA (US)

( * ) Notice: Subject to any disclaimer, the term of this patent is extended or adjusted under 35 U.S.C. 154(b) by 0 days.

(21) Appl. No.: 17/587,331

(22) Filed: Jan. 28, 2022

(51) Int. Cl.
| | |
|---|---|
| *G05B 19/00* | (2006.01) |
| *G06V 40/40* | (2022.01) |
| *G06V 40/10* | (2022.01) |
| *G06V 10/80* | (2022.01) |
| *G06V 10/42* | (2022.01) |
| *G06V 10/44* | (2022.01) |
| *G06V 10/25* | (2022.01) |

(52) U.S. Cl.
CPC ............. *G06V 40/45* (2022.01); *G06V 10/25* (2022.01); *G06V 10/42* (2022.01); *G06V 10/44* (2022.01); *G06V 10/80* (2022.01); *G06V 40/117* (2022.01)

(58) Field of Classification Search
CPC ...... G06V 40/45; G06V 10/25; G06V 40/117; G06V 10/42; G06V 10/44; G06V 10/80; G06V 40/23
USPC ....................................................... 340/5.83
See application file for complete search history.

(56) References Cited

U.S. PATENT DOCUMENTS

| | | | |
|---|---|---|---|
| 2010/0127827 A1* | 5/2010 | Watanabe | .............. G06V 40/23 340/5.83 |
| 2014/0366113 A1 | 12/2014 | LeCun et al. | |
| 2016/0070967 A1 | 3/2016 | Du et al. | |
| 2016/0321496 A1 | 11/2016 | Mather et al. | |
| 2020/0026939 A1 | 1/2020 | Sim et al. | |
| 2022/0318376 A1 | 10/2022 | Cho et al. | |

OTHER PUBLICATIONS

Office Action dated Oct. 14, 2022 in U.S. Appl. No. 17/587,359.
Office Action dated Mar. 27, 2023 in U.S. Appl. No. 17/587,296.
Kanhangad et al., "Anti-spoofing for display and print attacks on palmprint verification systems", Proceedings of SPIE, Biometric and Surveillance Technology for Human and Activity Identification, May 15, 2015, pp. 1-9, vol. 9457, Indore, India.

* cited by examiner

*Primary Examiner* — Abdul-Samad A Adediran
(74) *Attorney, Agent, or Firm* — Venable LLP

(57) ABSTRACT

The present teaching relates to detecting palm liveness. When an image is received with visual information claimed to represent a palm of a person, an initial region of interests (ROI) is identified from the image that corresponds to the palm and an initial dimension thereof is determined. When the initial dimension is smaller than a specified dimension, the initial ROI is extended in some respective directions to some expansion region with certain expansion dimension to generate an ROI using the visual information in the ROI from the image. A plurality of decisions are obtained with respect to the ROI, each of which is made individually on whether the ROI represents a specific type of fake palm. The decisions are then combined to derive a liveness detection decision on whether the palm captured in the image is live.

24 Claims, 25 Drawing Sheets

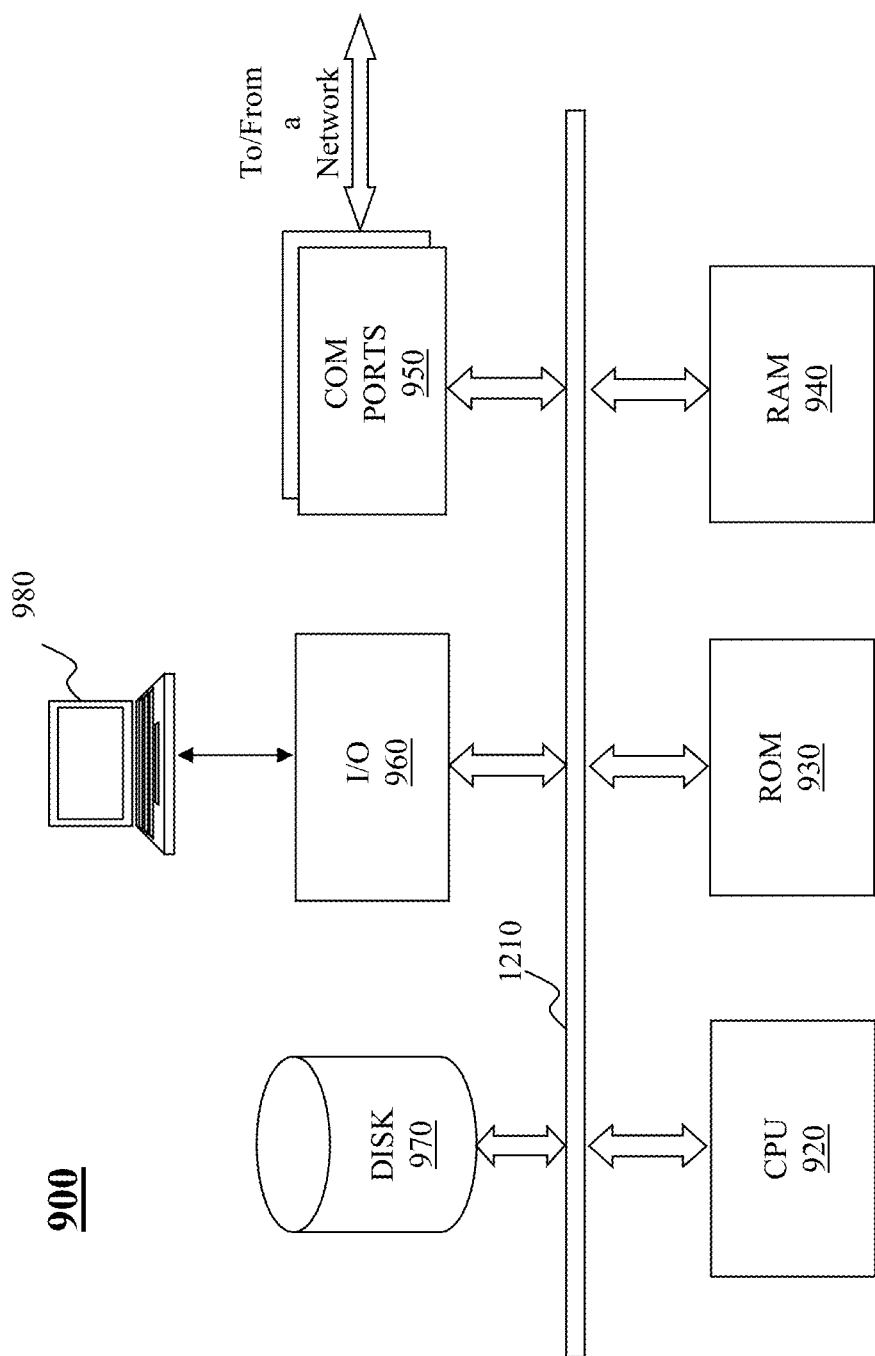

SYSTEM AND METHOD FOR GENERATING REGION OF INTERESTS FOR PALM LIVENESS DETECTION

CROSS-REFERENCE TO RELATED APPLICATIONS

The present application is related to U.S. application Ser. No. 17/587,296 filed on Jan. 28, 2022, entitled "SYSTEM AND METHOD FOR DETECTING LIVENESS OF BIOMETRIC INFORMATION" and U.S. application Ser. No. 17/587,359 filed on Jan. 28, 2022, entitled "SYSTEM AND METHOD FOR ROBUST PALM LIVENESS DETECTION USING VARIATIONS OF IMAGES", the contents of which are hereby incorporated by reference in their entireties.

BACKGROUND

1 Technical Field

The present teaching generally relates to computer-based biometrics. More specifically, the present teaching relates to liveness detection in biometrics.

2. Technical Background

With the development of the Internet and the ubiquitous network connections, more and more secure access controls are done via biometrics. For example, almost all smart phones nowadays have either fingerprint or face based biometrics authentication. Some of public places such as airports and government buildings, access to such places may also be controlled via biometric-based authentication. Private companies have also used biometrics to monitor not only the access to workplaces but also the working hours of employees. The types of biometrics used for authentication have also expanded from the initial fingerprints to finger veins, faces, palms, and palm veins. FIG. 1A shows an example of using palms for authentication in, e.g., access control. In this example, a person who is to be authenticated may place a palm over a palm based authentication device 120 (FIG. 1B) with imaging sensors deployed therein as shown as 100. The sensed palm image may be shown as 110 in FIG. 1A.

With the development of biometrics and the increasingly wider range of applications, they also face with challenges, some of which relate to the use of different forms of fake biometrics, which include high definition prints such as photos or reproduced drawings, videos, or even three dimensional (3D) molds of fingerprints, faces, or palms, which is shown in FIG. 1B. Because of that, different biometrics systems now adopt the step of detecting the liveness of the biometric evidence associated with a person to be authenticated prior to authenticating the person. If the biometric evidence presented for authentication is detected as not alive, then the person is rejected of access.

FIG. 1C illustrates a typical system diagram of an example palm based authentication device 120 with liveness detection capability. In this illustrated example, the palm based authentication device 120 includes an imaging unit 125, a liveness determiner 130, a palm template constructor 140, a palm based verification unit 150, and an access control unit 160. When a person places a palm over the device 120, the imaging unit 125 acquires a palm image and sends to the liveness determiner 130 to determine whether the palm image acquired represents a live palm representation, i.e., liveness detection. If the acquired image is considered not alive, the acquired image will not be processed for authentication. When the acquired image is considered to represent a live palm, the palm template constructor 140 is invoked to extract features from the acquired palm image and generate a template, which is then used by the palm based verification unit 150 to be compared with previously stored palm templates for people who have been authorized. If there is a match, the person is authenticated and the access control unit 160 is invoked to allow the access of the person, e.g., opening an access door.

In detecting liveness of any biometric information, it is essential to be able to detect any type of ways to fake the information so that no matter which type of fake biometrics is presented, the liveness detection is able to recognize it. Conventionally, a typical way to do that is to train a fake palm detection model based on training data including actual palm images and different types of fake palms. This is shown in FIG. 1D (PRIOR ART), where real pam images 165 and various collected fake palm images 190 (printed fake palms 190-1, photo-based fake palms 190-2, ..., video-based fake palms 190-I, ..., and 3D mold based fake palms 190-K) are fed to a detection model training unit 170 that learns from the differences between the actual palm images 165 and different types of fake palm images 190 and generates a fake palm detection model 180 from the learning. Such a trained fake palm detection model 180 is then used, whenever palm biometrics information is acquired, to determine whether the acquired palm biometric information represents a live palm or not.

The conventional approach presents several problems. First, when a binarized liveness detection is adopted trying to distinguish between a live palm image and all fake palm images, it is unlikely to succeed due to the fact that the difference between and among different types of fake palms in general is larger than that between the real palm and any type of fake palm. Given that, despite the extensive training, the model acquired by treating all fake palms as one class against the real palm as the other class likely cannot achieve the desired discriminant capability. Second, to detect the liveness of a palm, a region of interest (ROI) may be identified from a palm image and the detection is performed on the ROI. A common practice is to use ROIs of a known shape such as a square ROI region. Due to variation in acquiring a palm image and/or placement of the palm relative to the sensor, the dimensions of the acquired palm regions likely vary. This is shown in FIG. 1E, where in images 192-1, 192-2, and 192-3, the palm appears in different regions and they lead to ROIs (ROI-1 in 192-1, ROI 2 in 192-2, and ROI 3 in 192-3) in different shapes and dimensions ({W1, H1} for ROI 1, {W2, H2} for ROI 2, and {W3, H3} for ROI 3). A common approach to address this issue is to pad the originally detected ROIs with pixels of zero intensity to derive a desirable ROI dimension. This is shown in FIG. 1E. Assume that {W2, H2} is the required dimension, ROI 1 192-1 and ROI 3 192-3 do not meet the required dimension and both need to be expanded or padded in their widths. One way to expand is to pad on one side of the original ROI. For instance, ROI 1 192-1 is padded on one side (e.g., on the left side as shown in FIG. 1E) with a padded region having a width of W01 and same length as the original ROI so that the padded ROI has a width of W01+W1=W2. Another way to pad ROI 1 192-1 is to pad both sides equally with a width of W01/2 on each side so that the padded ROI has a width of 2(W01/2)+W1=W2. The example of ROI 3 192-3 has a palm imaged along one side of the image (on the edge). In this case, the detected original ROI may be padded as described in FIG. 1E. Padding an original ROI with pixels with zero intensities causes loss of information and distortion of semantics of the palm image.

Another issue in liveness detection has to do with robustness. Typically, one palm image is acquired and then used to detect the liveness. It is commonly known that depending on the imaging acquisition conditions, the quality of the image may differ, leading to variable performance in liveness detection. Such imaging conditions may be due to the distance between the palm and the imaging device so that the detected palm ROI may vary in size. In some situations, the varying imaging conditions may also be due to, e.g., lighting of the surroundings. It is not desirable that detection result depends on the imaging conditions. This is illustrated in FIG. 1F, where the same pal may lead to different acquired images due to variations in imaging conditions. Image 195-1 is acquired with brighter imaging condition while image 195-2 is acquired under a darker lighting condition. The difference may lead to different, and thus unpredictable, outcomes in liveness detection.

Thus, there is a need for enhanced liveness detection in biometric based authentication systems that overcome the discussed shortcomings in order to achieve a more robust performance.

SUMMARY

The teachings disclosed herein relate to methods, systems, and programming for information management. More particularly, the present teaching relates to methods, systems, and programming related to hash table and storage management using the same.

In one example, a method, implemented on a machine having at least one processor, storage, and a communication platform capable of connecting to a network for detecting liveness. When an image is received with visual information claimed to represent a palm of a person, an initial region of interests (ROI) is identified from the image that corresponds to the palm and an initial dimension thereof is determined. When the initial dimension does not satisfy a specified dimension, the initial ROI is extended in some respective directions to some expansion region with certain expansion dimension to generate an ROI using visual information from the image within the ROI. A plurality of decisions are obtained, each of which is made individually on whether the ROI represents a specific type of fake palm. The decisions are then combined to derive a liveness detection decision on whether the palm captured in the image is live.

In a different example, a system is disclosed for detecting liveness. The system includes a palm region of interests (ROI) detector and a palm liveness detector. The palm ROI detector is configured for receiving an image with visual information claimed to represent a palm of a person and identifying an initial region of interests (ROI) in the image that corresponds to the palm and an initial dimension associated with the initial ROI. If the initial dimension does not satisfy a specified dimension according to a specification, an expansion dimension is determined for each of at least one expansion region in respective one or more directions and used to extend the initial ROI in the one or more directions to the at least one expansion region and generate an ROI using the visual information in the ROI of the image. The palm liveness detector is configured for obtaining a plurality of decisions, each of which is made individually on whether the ROI represents a corresponding one of a plurality of types of fake palm and combining the plurality of decisions to derive a liveness detection decision on whether the palm captured in the image is live.

Other concepts relate to software for implementing the present teaching. A software product, in accordance with this concept, includes at least one machine-readable non-transitory medium and information carried by the medium. The information carried by the medium may be executable program code data, parameters in association with the executable program code, and/or information related to a user, a request, content, or other additional information.

Another example is a machine-readable, non-transitory and tangible medium having information recorded thereon for detecting liveness. The information, when read by the machine, causes the machine to perform various steps. When an image is received with visual information claimed to represent a palm of a person, an initial region of interests (ROI) is identified from the image that corresponds to the palm and an initial dimension thereof is determined. When the initial dimension does not satisfy a specified dimension, the initial ROI is extended in some respective directions to some expansion region with certain expansion dimension to generate an ROI. A plurality of decisions are obtained, each of which is made individually on whether the ROI represents a specific type of fake palm. The decisions are then combined to derive a liveness detection decision on whether the palm captured in the image is live.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 9 is an illustrative diagram of an exemplary computing device architecture that may be used to realize a specialized system implementing the present teaching in accordance with various embodiments.

DETAILED DESCRIPTION

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or system have been described at a relatively high-level, without detail, in order to avoid unnecessarily obscuring aspects of the present teachings.

The present teaching discloses solutions for liveness detection that address different deficiencies observed in the biometric industry. Although the solutions as described herein are illustrated in the context of palm liveness detection, the approached and concepts may also be applied to other types of biometric information such as face. Instead of treating real biometric information and fake biometric information which has different types as two classes to be distinguished, the present teaching discloses a liveness detection approach in which each type of fake biometric information is modeled and detected individually and for each incoming image, its liveness is determined by different liveness detectors, each of which is specifically trained to detect a specific type of fake form of biometric information. The individual liveness decisions from different liveness detectors are then combined to reach an overall decision as to whether the incoming image represents fake biometric information or not.

In addition, to improve the robustness of the detection, different approaches are devised in generating ROIs that localize the relevant biometric information to be authenticated (palm, face, or fingerprint) that provide more reliable contextual and semantic information related to the relevant biometric information. To further enhance the reliability of a detection result, instead of relying on one single image acquired for detecting liveness, variations of the image are generated and used for separately determining liveness. In detecting each of the variant images, multiple liveness detectors are applied each of which is directed to a specific type of fake type so that the overall detection result for the liveness of the specific variant image is made based on the results from such multiple liveness detectors. Then the liveness detection result for the image is determined based on the liveness detection results for all the variant images according to some integration scheme. Although the details may be provided based on palm liveness detection, the concepts and solutions described herein may also be used for detecting liveness of other types of biometric information such as face or fingerprint.

Figure 2A:
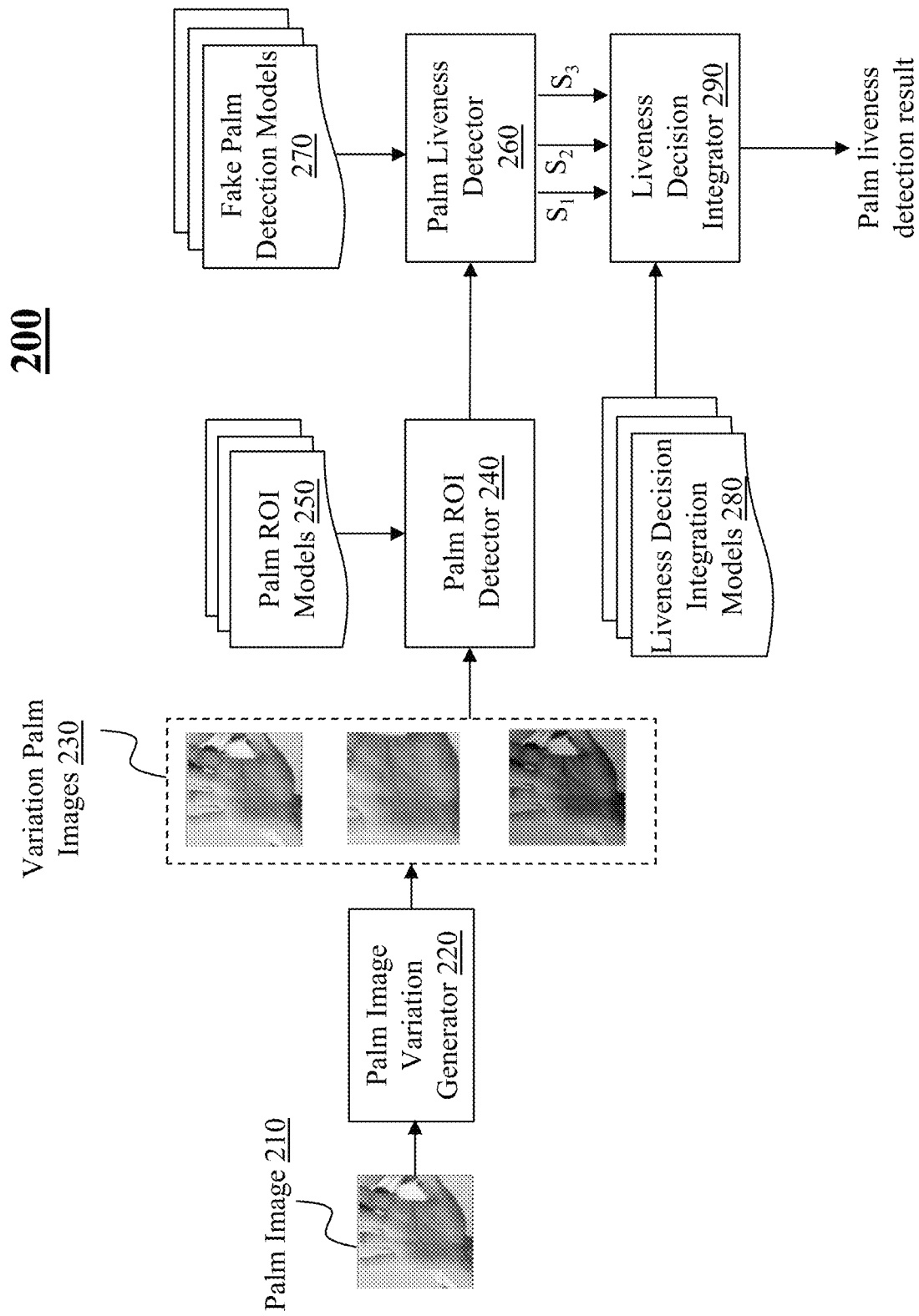
FIG. 2A depicts an exemplary high level system diagram of a palm liveness detection mechanism, in accordance with an embodiment of the present teaching.
Figure 2B:
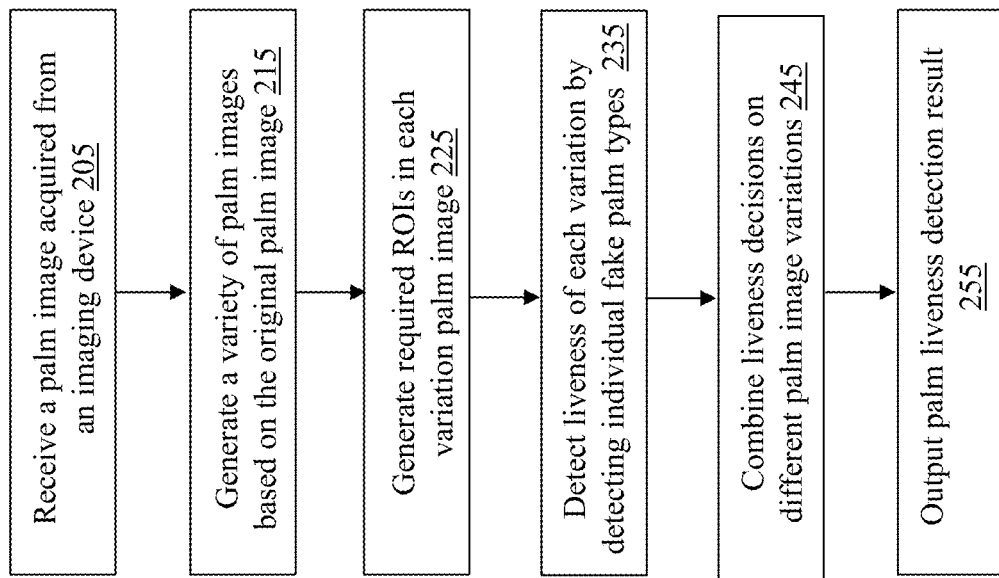
FIG. 2B is a flowchart of an exemplary process of a palm liveness detection mechanism, in accordance with an embodiment of the present teaching.

FIG. 2A depicts an exemplary high level system diagram of a palm liveness detection mechanism 200, in accordance with an embodiment of the present teaching. In this exemplary embodiment, the palm liveness detection mechanism 200 comprises a palm image variation generator 220, a palm ROI detector 240, a palm liveness detector 260, and a liveness decision integrator 290. FIG. 2B is a flowchart of an exemplary process of the palm liveness detection mechanism 200, in accordance with an embodiment of the present teaching. In operation, receiving an image 210 for a palm at 205, either from an actual palm or a fake palm, the palm image variation generator 220 is provided to generate, at 215, a number of variation palm images 230 from the palm image 210, each of which will be used to detect the liveness of the palm to improve the robustness. To facilitate the palm liveness detection, the palm ROI detector 240 identifies a region of interest of the palm in each of the variation palm images 230 and generates, at 225, ROIs of a predetermined dimension based on certain palm ROI models 250.

Such generated palm ROIs of a predetermined dimension are then sent to a palm liveness detector 260, which detects, at 235, the liveness of each of the ROIs from the variation palm images 230 against individual fake palm detection models 270. The multiple liveness detection results based on ROIs derived from the variation palm images 230 are then sent to the liveness decision integrator 290, where the individual liveness detection results from 260 are integrated, at 245, based on liveness decision integration models 280 to output, at 255, a palm liveness detection result. Details associated with generation of variation palm images 230, ROIs of a certain dimensions from the variation palm images, the detection of liveness of the palm captures in the ROIs against individual fake palm models, and integration of liveness results derived from variation palm images are presented below with reference to FIGS. 3A-7B.

Figure 3A:
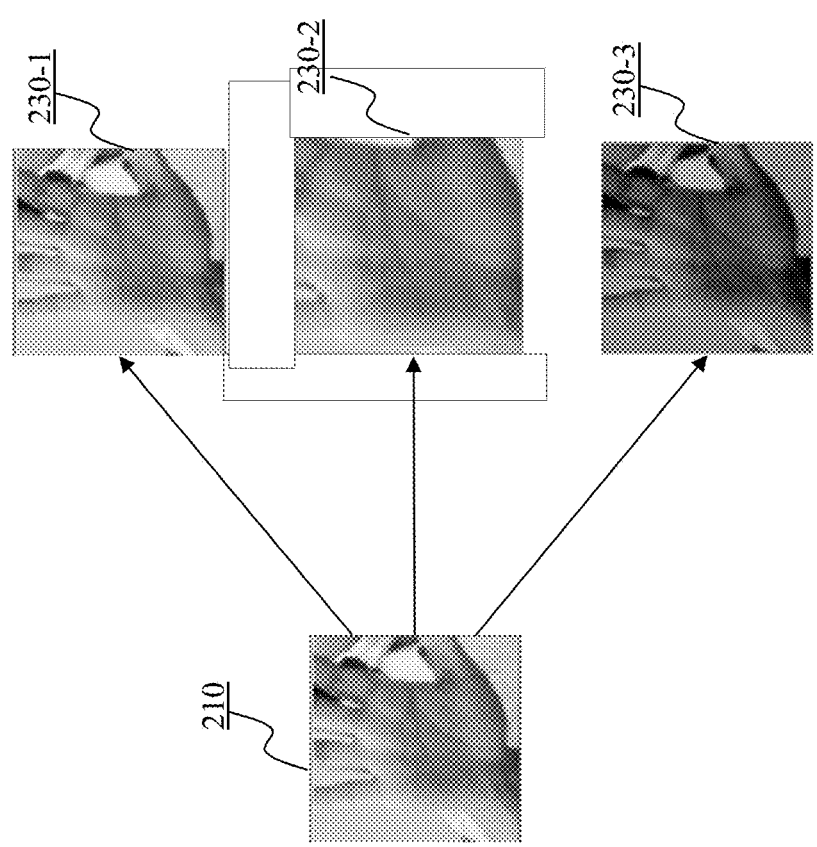
FIG. 3A shows the use of variations of a palm image for liveness detection to enhance robustness, in accordance with an embodiment of the present teaching.

FIG. 3A shows the use of variations of a palm image for liveness detection to enhance robustness, in accordance with an embodiment of the present teaching. As discussed herein, to overcome the unreliable outcome in liveness detection due to, e.g., imaging conditions, the palm image may be used to generate a variety of variations under different imaging conditions to improve the reliability of liveness detection. As illustrated in FIG. 3A, an original palm image 210 may be used as the basis for generating variation palm images 230, including, e.g., some variation with different lighting conditions (230-1 and 230-3) or different resolution (230-2). This is illustrated in FIG. 3C, where variation palm images may include, e.g., the original palm image, a focused palm image (e.g., ROI or image information in a region with enhanced super resolution), an intensity varied palm image, . . . , and variations generated using varying lighting conditions. In generating a variation with varying lighting conditions, it may be done either via taking multiple images with controlled changes in lighting conditions (which is possible in image acquisition stage) or by electronically creating the variation by changing the intensities via a lighting varying function provided by some commercially available software.

Figure 3B:
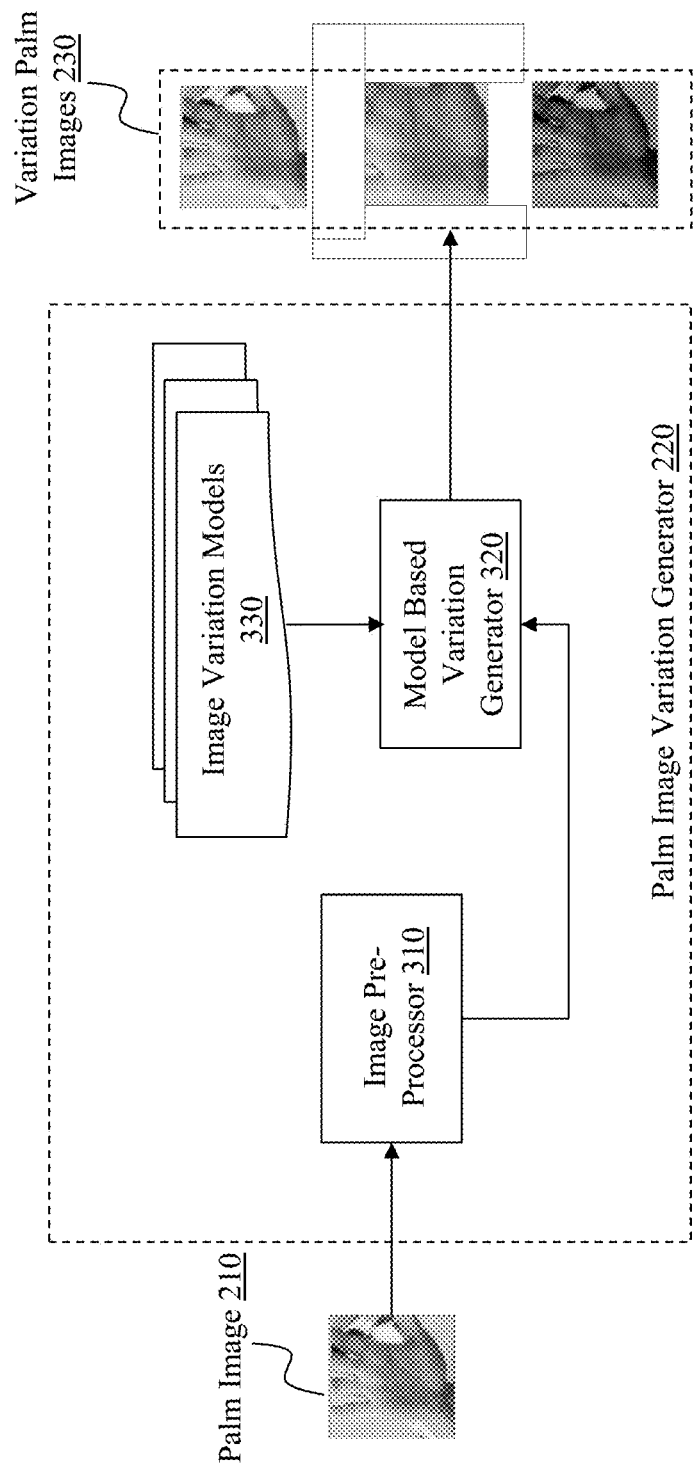
FIG. 3B depicts an exemplary high level system diagram of a palm image variation generator, in accordance with an embodiment of the present teaching.
Figure 3C:
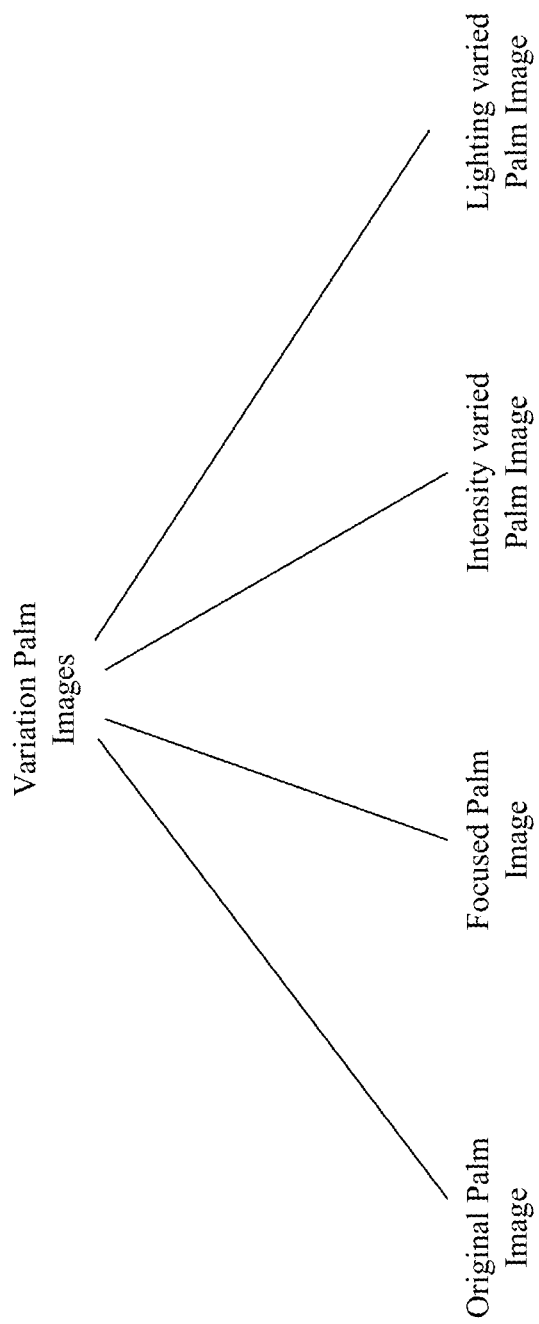
FIG. 3C illustrates exemplary ways of generating varying palm images, in accordance with an exemplary embodiment of the present teaching.
Figure 3D:
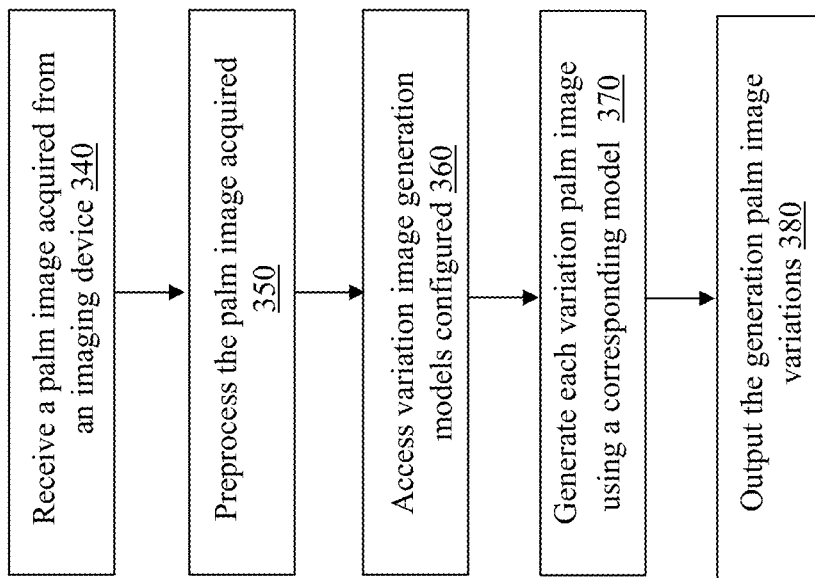
FIG. 3D is a flowchart of an exemplary process for a palm image variation generator, in accordance with an embodiment of the present teaching.

FIG. 3B depicts an exemplary high level system diagram of the palm image variation generator 220, in accordance with an embodiment of the present teaching. In this illustrated embodiment, the palm image variation generator 220 comprises an image pre-processor 310 and a model based variation generator 320. FIG. 3D is a flowchart of an exemplary process for the palm image variation generator 220, in accordance with an embodiment of the present teaching. When the image pre-processor 310 receives, at 340, a palm image 210 acquired, it preprocesses, at 350, the palm image 210 and sends the preprocessed image to the model based variation generator 320. To generate the variations, the model based variation generator 320 accesses, at 360, models to be used for creating palm image variations stored in 330. The accessed models are used by the model based variation generator 320 to generate, at 370, each of the variations for the input palm image in accordance with the models from 330. Such generated variations are then output to be used in liveness detection. As depicted in FIG. 2A, such generated variations are further processed to generate ROIs in the variations with a predetermined dimension in a manner that overcome problems associated with the conventional approaches.

Figure 4A:
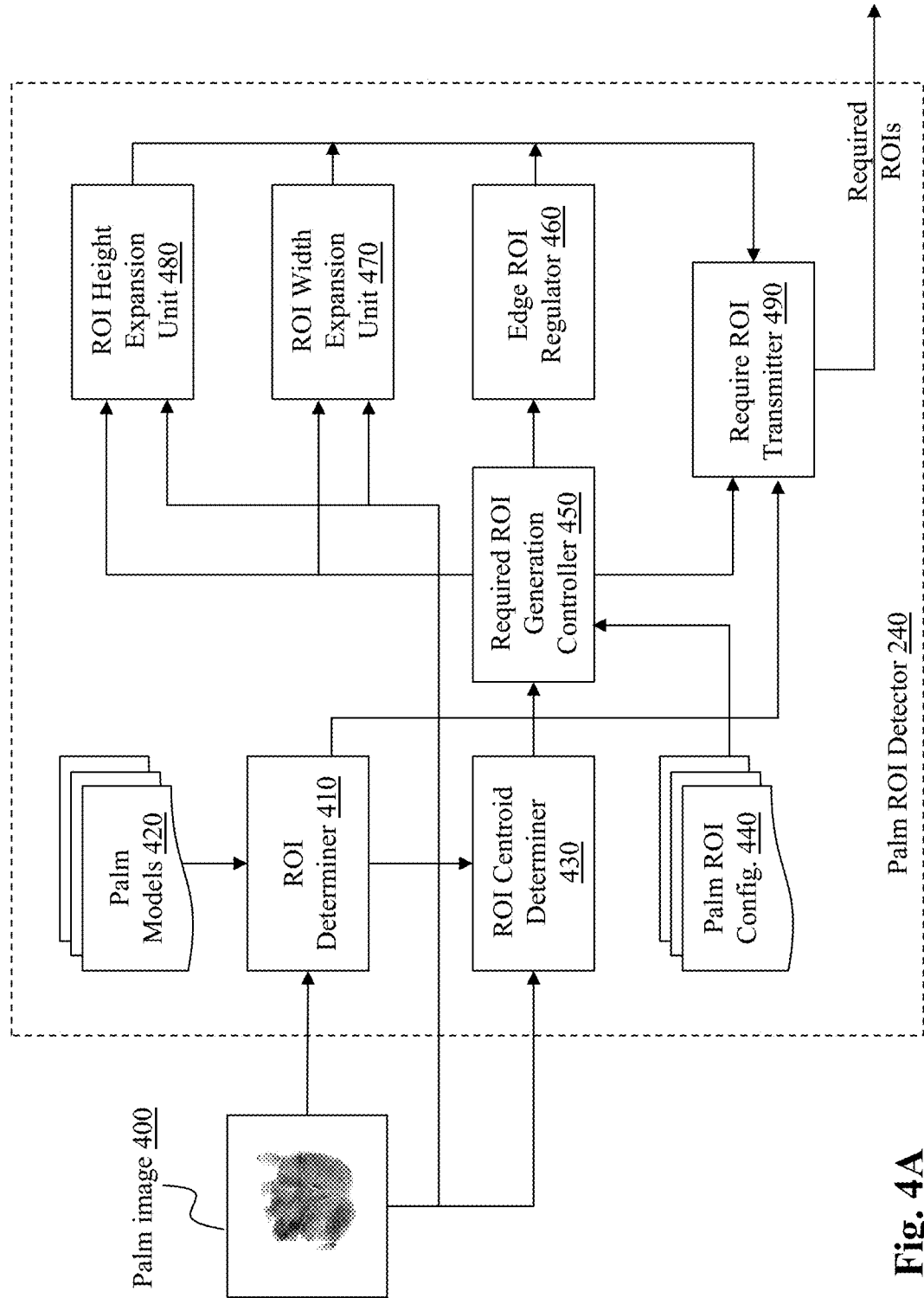
FIG. 4A depicts an exemplary high level system diagram of a palm ROI detector, in accordance with an embodiment of the present teaching.

FIG. 4A depicts an exemplary high level system diagram of the palm ROI detector 240, in accordance with an embodiment of the present teaching. In this illustrated embodiment, the palm ROI detector 240 comprises an ROI determiner 410, an ROI centroid determiner 430, a required ROI generation controller 450, and various ROI adjustment units, including an ROI height expansion unit 480, an ROI width expansion unit 470, and an edge ROI regulator 460, as well as a required ROI transmitter 490.

In some embodiments, in detecting liveness of a palm, the ROI image to be used for the testing may be required of a certain shape, e.g., a square ROI with equal number of pixels along each side, e.g., 112×112. Such requirements may be specified as configuration of the palm ROI detector 240 and stored in 440. As discussed herein, to meet such requirement, a region of interest detected enclosing a palm may not meet the requirements, both in shape or in size. As discussed herein, to make an initially detected ROI to meet the required shape and size, conventional approaches expand the initial ROI in different directions by a certain size to make the shape meet the requirement (e.g., a square). For instance, if an initial ROI is W×H or 78×102, where W is the width and H is the height of the initial ROI. To make it squared, if W<H, then expand (H−W)/2 on both sides of the initial ROI so that the width is extended to 102. That is, extending (102−78)/2 columns on both sides of the initial ROI, generating a 102×102 ROI. On the other hand, if W>H, then extend top and down of the initial ROI by (W−H)/2 rows.

Figure 1A:
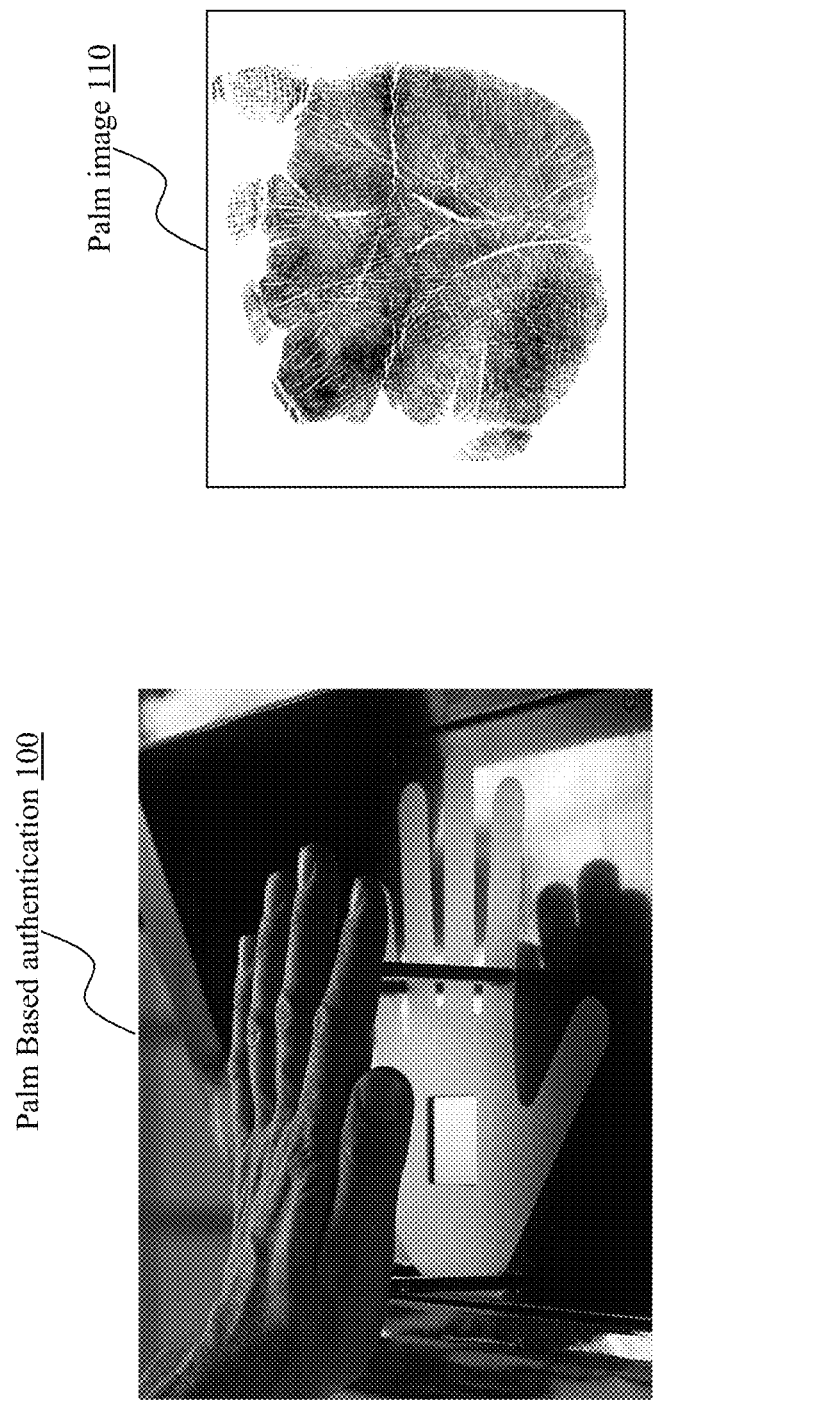
FIGS. 1A-1F illustrate palm liveness detection and conventional solutions.
Figure 1B:
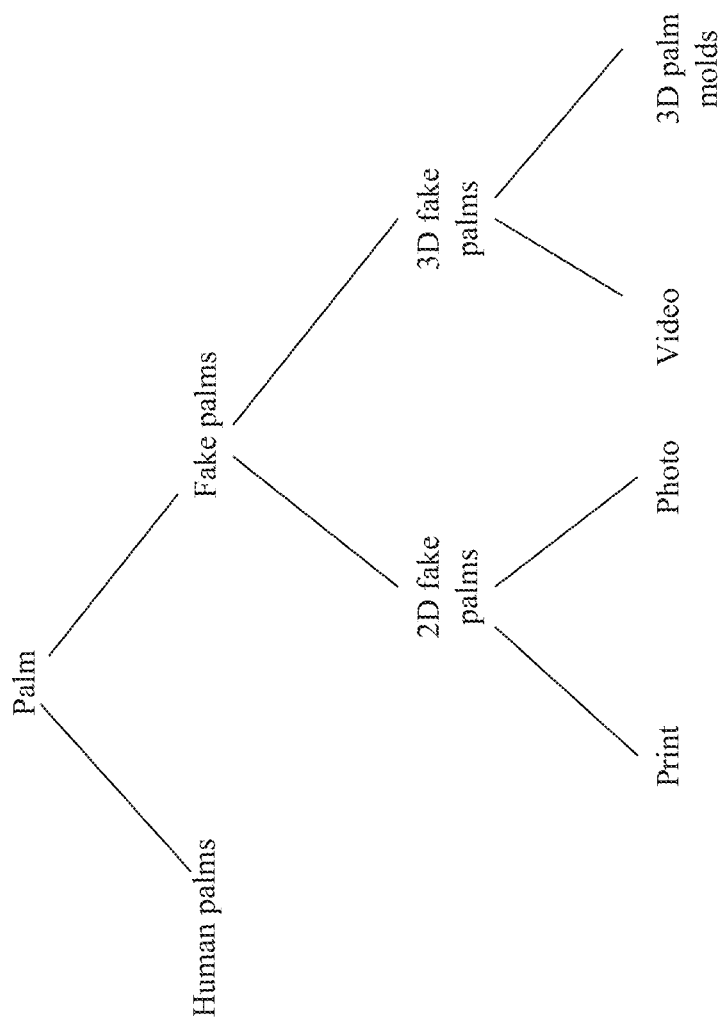
Figure 1C:
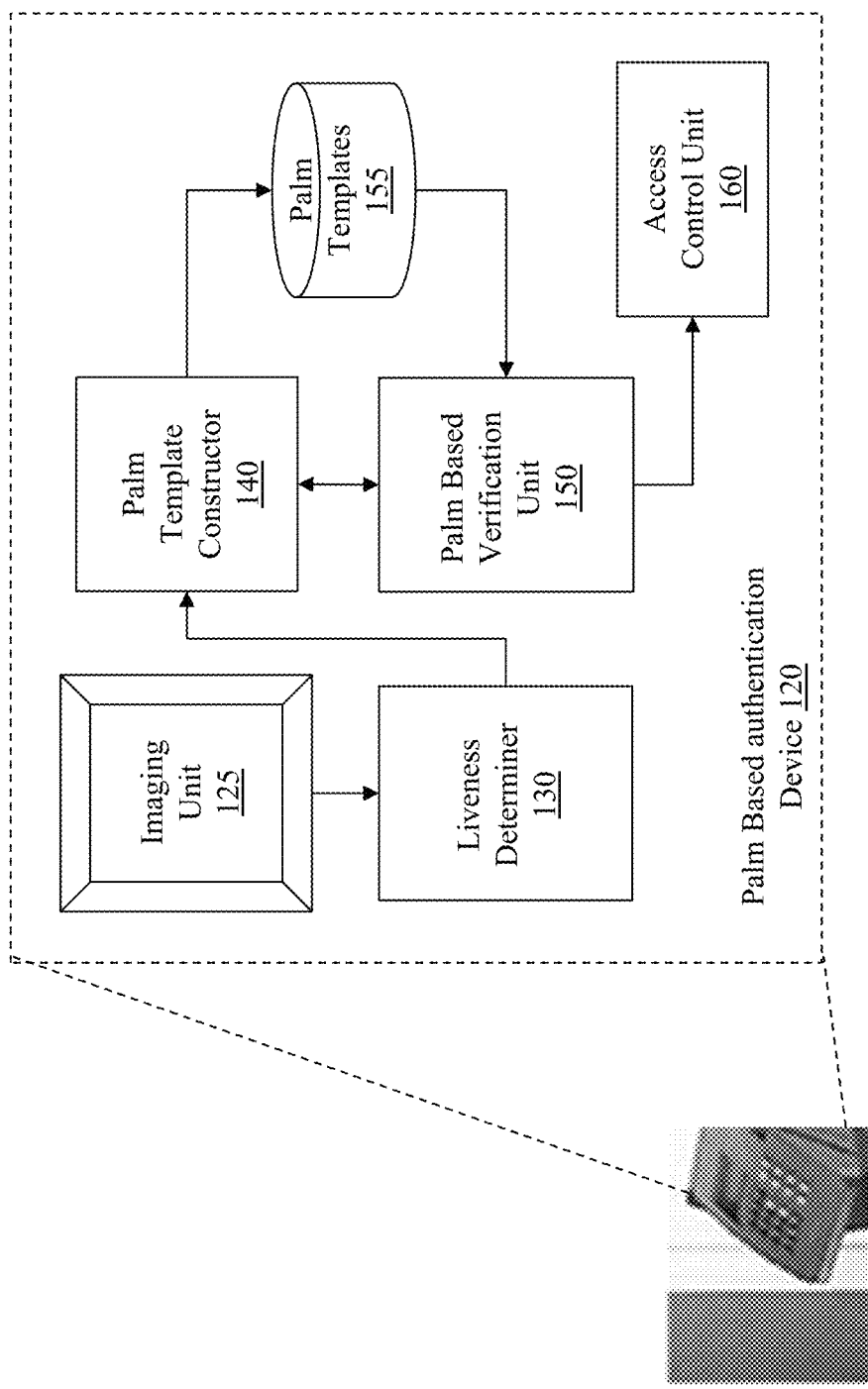
Figure 1D:
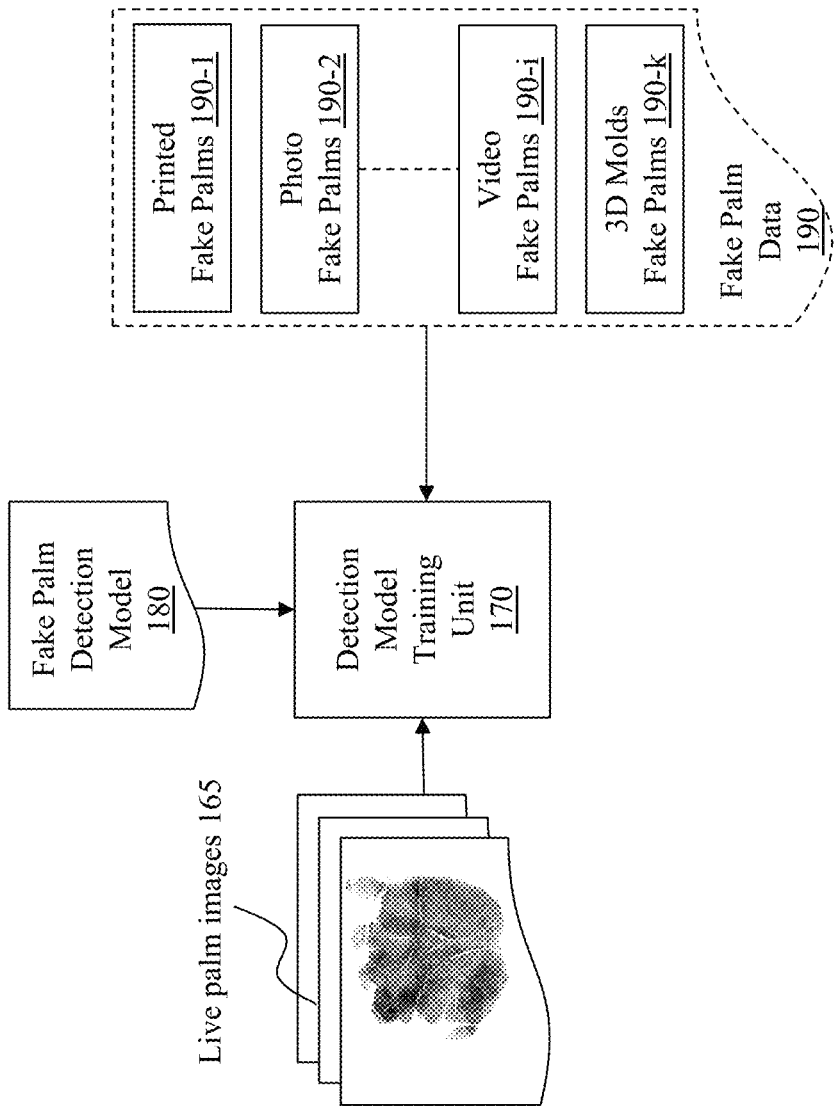
Figure 1E:
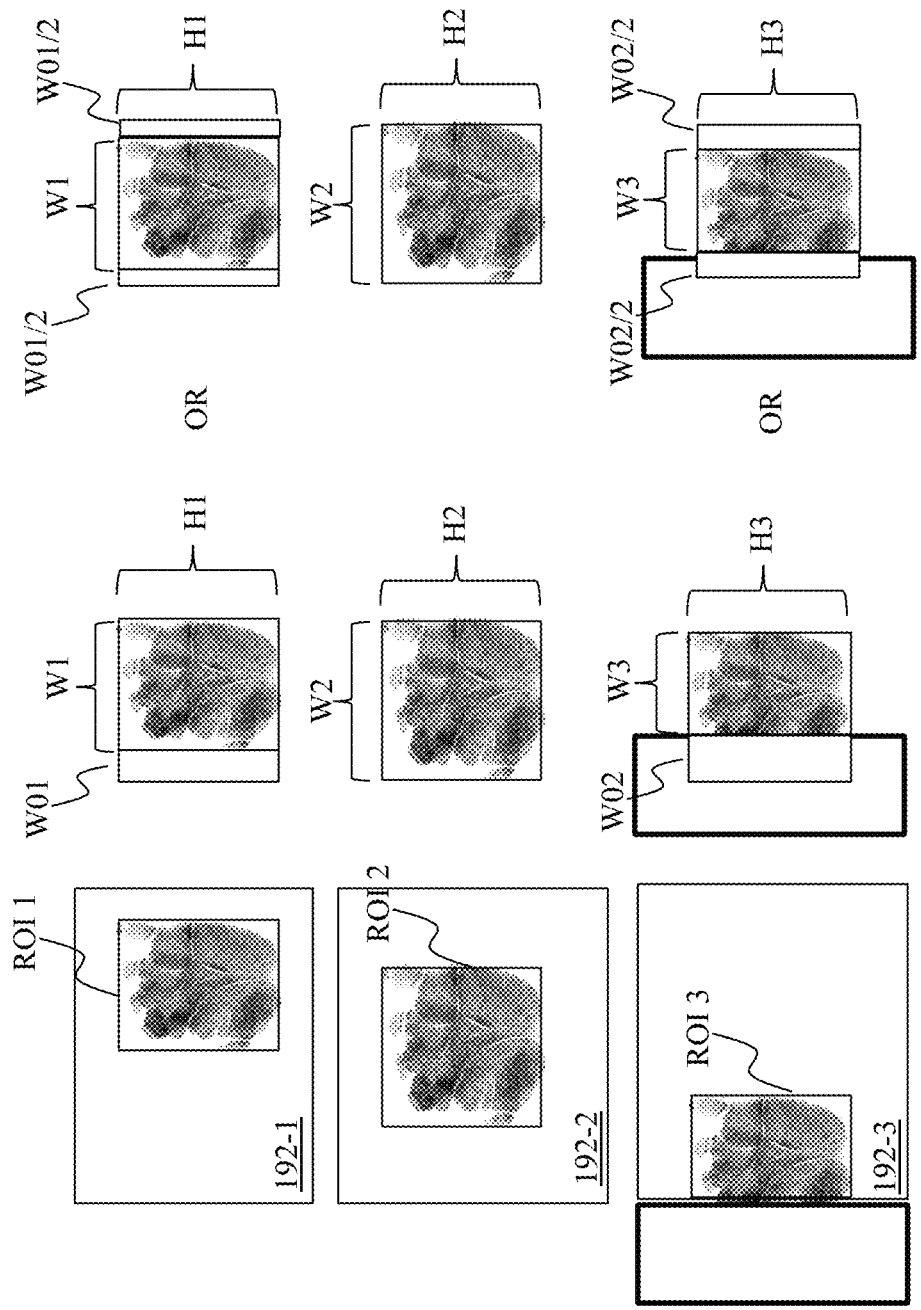
Figure 1F:
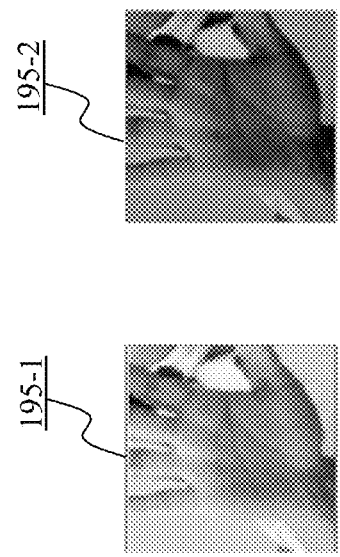

Convention approaches will fill in pixels with zero values in the (102−78)/2×102 strips on both left and right sides, as shown in FIG. 1E. As discussed herein, this treatment removes the context of the palm and eliminates relevant semantics, making the analysis unreliable. To improve the quality of data to be used for liveness detection, the present teaching uses the actual data in the image 400 to expand the initial ROI in different directions. For instance, if the upper left corner of the initial 78×102 ROI is at (x1,y1) of image 400, the upper left corner if the squared 102×102 ROI is now at (x1', y1), where x1'=x1−(102−78)/2. The content of the 102×102 ROI is obtained from the image 400 from a squared area across x1'−(x1'+102) columns and y1−y1+102 rows. That is, the squared 102×102 ROI is expanded using the content from the image 400 (instead of using zero pixel values). To meet the shape requirement, the squared RIO may then be resized to the required size, e.g., 112×112.

Figure 4B:
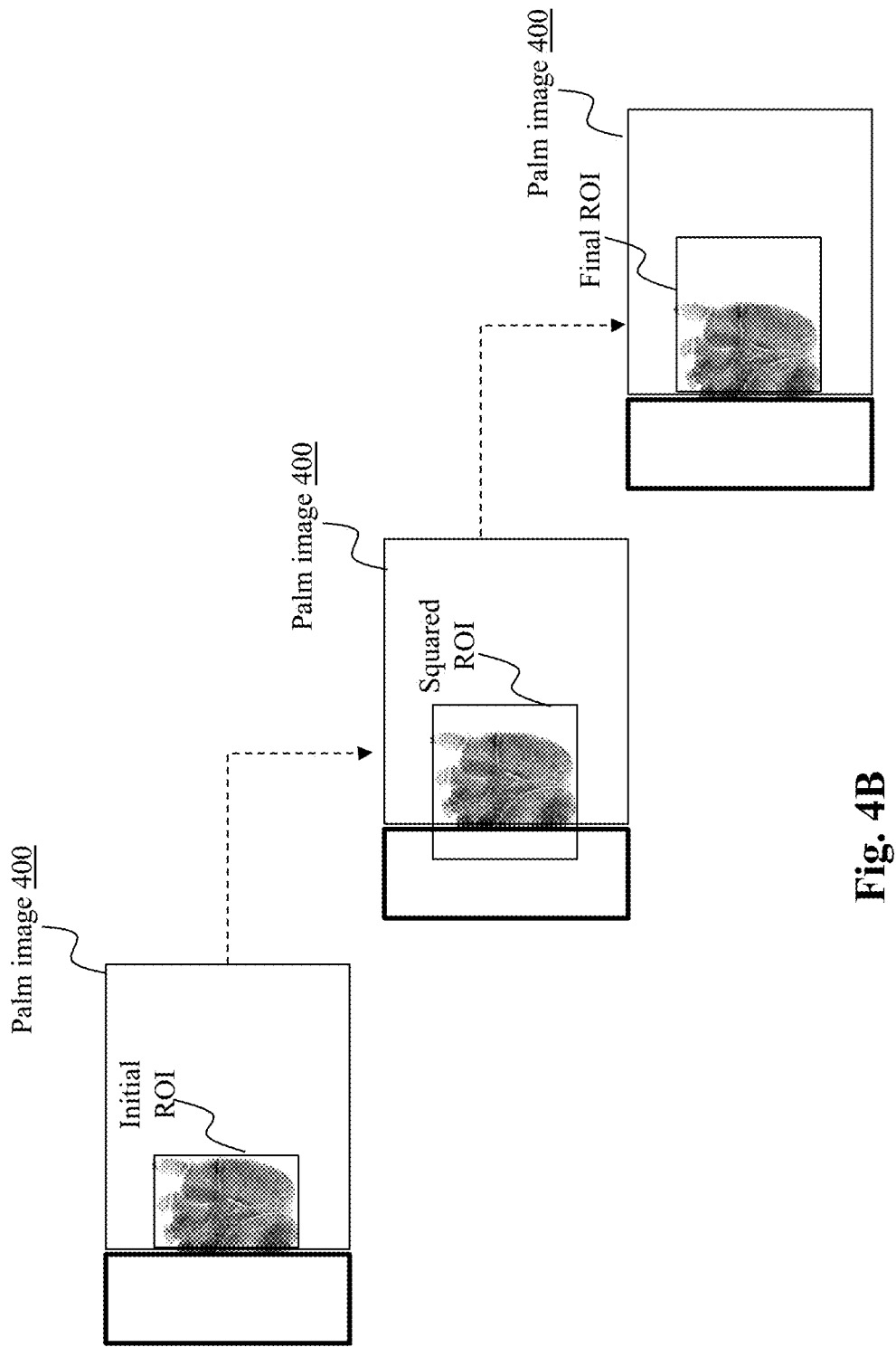
FIG. 4B illustrates a process of identifying a ROI for a palm on the edge of an image, in accordance with an embodiment of the present teaching.

When the initial ROI is along a boarder of image 400, as shown in FIG. 4B, the initial ROI can be extended the same way to create a squared ROI as shown with one side being outside of the image 400. The squared ROI may then be moved in the horizontal direction towards inside of the image 400 until all pixels of the ROI is within the image 400, yielding a final ROI.

Figure 4C:
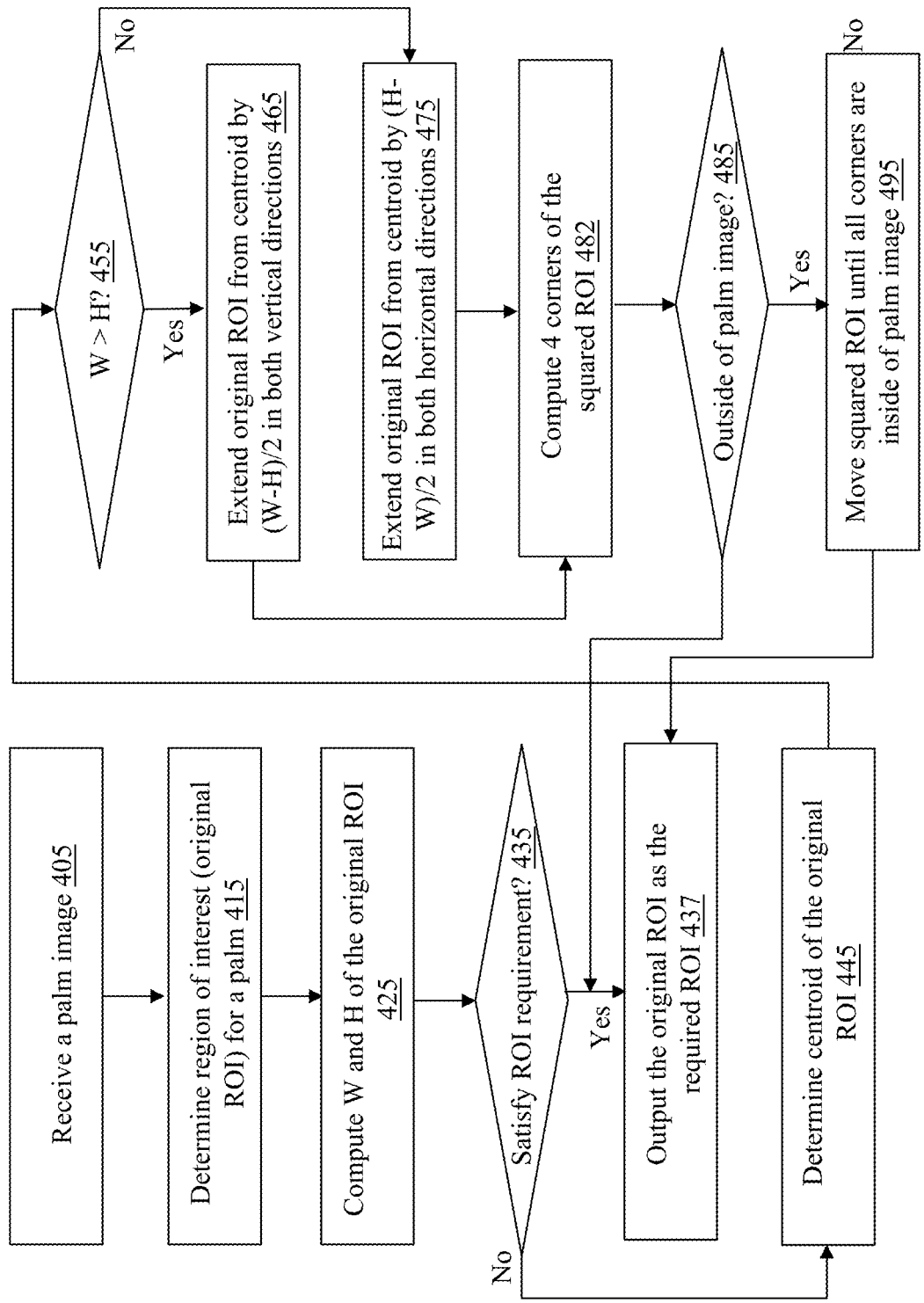
FIG. 4C is a flowchart of an exemplary process of a palm ROI detector, in accordance with an embodiment of the present teaching.

FIG. 4C is a flowchart of an exemplary process of the palm ROI detector 240, in accordance with an embodiment of the present teaching. In operation, when the ROI determiner 410 receives, at 405, a palm image 400 (any of the variation palm images), it determines, at 415, a region in the input image 400 that corresponds to the palm or an original ROI based on, e.g., palm detection models stored in 420. The width W and height H of the original ROI is computed at 425. If the original ROI (W and H) satisfies the requirements for a ROI, determined at 435, the original ROI is output as the required ROI at 437. Otherwise, the original ROI needs to be expanded to meet the requirement. To prepare for that, the ROI centroid determiner 430 computes, at 445, the centroid of the original ROI, which may be used to determine which rows and columns of the palm image are to be used to expand the original ROI.

To determine what additional operation needs to be performed on the original ROI to make the original ROI satisfy the requirement, the required ROI generation controller 450 accessed the requirement stored in the palm ROI configuration 440 and determines, at 455, whether width W of the original ROI is larger than the height H of the original ROI. If W>H, the original ROI is extended, at 465, from the centroid in both vertical directions (up and down) by (W−H)/2 rows. This is performed by the ROI height expansion unit 480. If H>W, the original ROI is extended, at 475, from the centroid in both horizontal directions (left and right) by (H−W)/2 columns. This is performed by the ROI width expansion unit 470.

To determine whether the original ROI is along the border of image 400, the four corners of the extended ROI are computed, at 482, and used to determine, at 485, whether the extended ROI needs to be moved within the image 400. If the extended ROI is within the image 400, the extended ROI is output, at 437, as the required ROI. Otherwise, the required ROI generation controller 450 invokes the edge ROI regulator 460 to move, at 495, the squared ROI towards interior of image 400 until all pixels are inside of image 400. This movement yields a required ROI, as illustrated in FIG. 4B, and is then output, at 437, as the required ROI. As discussed herein, the operation performed in accordance with the flow in FIG. 4C produces a required ROI inside the image 400 and the content within the required ROI is filled using the content directly from image 400 without padding using zero pixel values. Such yielded ROI provides better context and semantics for the palm localized inside the ROI and is used for detecting the liveness of the palm.

Figure 5A:
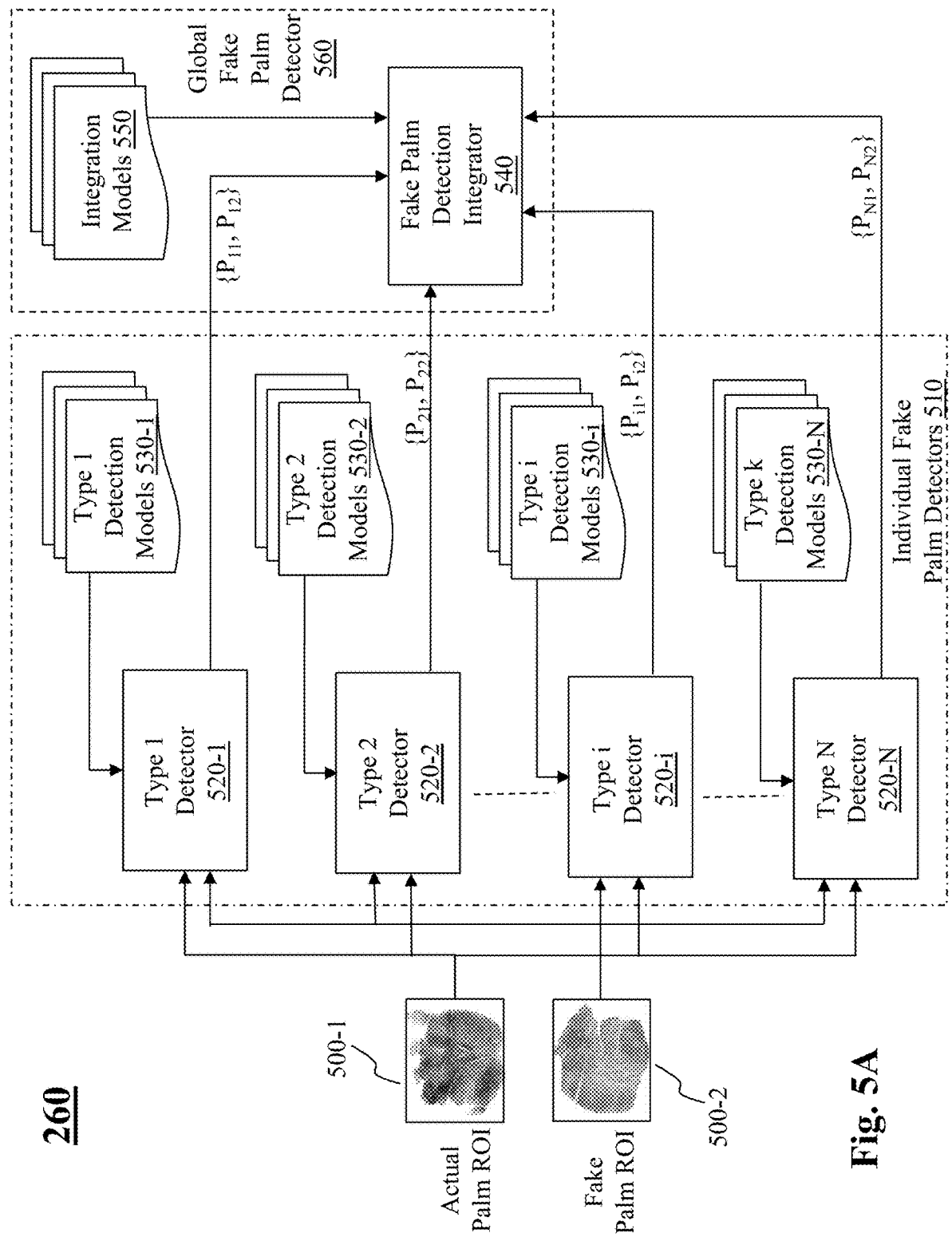
FIG. 5A depicts an exemplary high level system diagram of a palm liveness detector, in accordance with an exemplary embodiment of the present teaching.

As discussed herein, instead of treating all types of fake palm as one class against the real palm images, the present teaching provides individual detection means for different types of fake palm based on the observation that the differences between different types of fake palms are larger than the different between real and fake palms. FIG. 5A depicts an exemplary high level system diagram of the palm liveness detector 260, in accordance with an exemplary embodiment of the present teaching. In this exemplary embodiment, the palm liveness detector 260 comprises individual fake palm detectors 510, each of which is directed to detect a specific type of fake palm, and a global fake palm detector 560, which is provided to combine the individual detection results against different types of fake palm and obtain an overall liveness detection result.

As shown in FIG. 5A, the individual fake palm detectors 510 includes a type 1 detector 520-1, a type 2 detector 520-2, . . . , a type i detector 520-i, . . . , and a type N detector 520-N. Each of the individual fake palm detectors is dedicated to detecting one type of fake palm. For instance, the type 1 detector 520-1 may be dedicated to detecting a printed fake palm based on, e.g., type 1 detection models 530-1; the type 2 detector 520-2 may be dedicated to detecting a photo like fake palm based on, e.g., type 2 detection models 530-2; . . . , the type i detector 520-i may be dedicated to detecting a video based fake palm based on, e.g., type i detection models 530-i; . . . , and the type N detector 520-N may be dedicated to detecting a fake palm based on a 3D mold based on, e.g., type N detection models 530-N. The detection models for different types of fake palm may be obtained via, e.g., machine learning based on training data specific to the respective type of fake palm images in contrast with the real palm images.

Detection results from these individual fake palm detectors are used by the global fake detector 560 to reach a final decision on whether the input palm image 400 represents a fake palm. The input from each type of detector may be a tuple with, e.g., two probabilities $\{P_{i1}, P_{i2}\}$, with one, say $P_{i1}$, representing the likelihood of the palm image 400 being a type i fake palm and the other, say $P_{i2}$, representing the likelihood of the palm image 400 being a real palm image. The global fake palm detector 560 includes a fake palm detection integrator 540 that takes results from N individual fake palm detectors 520 as inputs ($\{P_{11}, P_{12}\}, \{P_{21}, P_{22}\}, \ldots, \{P_{i1}, P_{i2}\}, \ldots, \{P_{N1}, P_{N2}\}$) and derives a detection result based on some integrations models 550, which may be trained via machine learning using training data. The integration models may be embedded with various parameters whose values may be learned as well during the training.

Figure 5B:
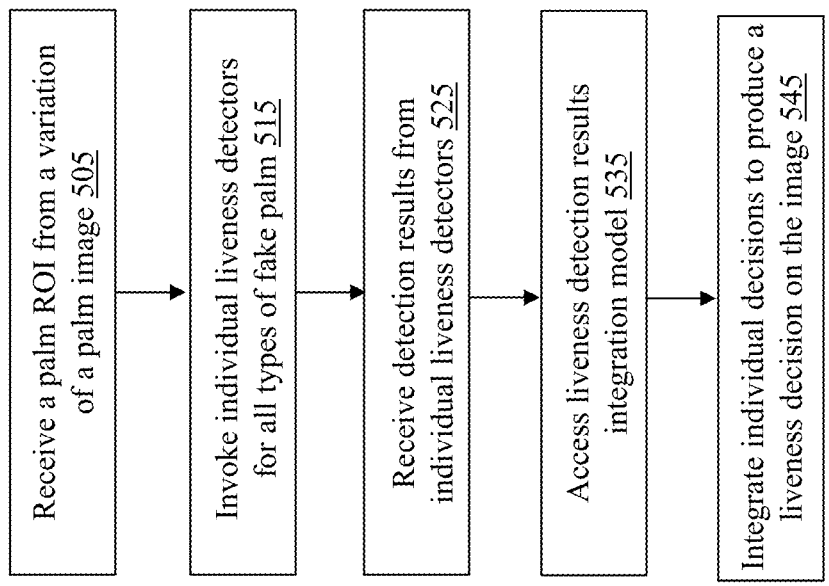
FIG. 5B is a flowchart of an exemplary process of a palm liveness detector, in accordance with an exemplary embodiment of the present teaching.

FIG. 5B is a flowchart of an exemplary process of the palm liveness detector 260, in accordance with an exemplary embodiment of the present teaching. When an input image corresponding to an ROI is received at 505, which may be either 500-1 from an actual palm image or 500-2 from a fake palm image, the individual liveness detectors 520-1, 520-2, . . . , 520-i, . . . , and 520-N are invoked, at 515, to individually detect liveness against different types of fake palm. As discussed herein, each of the liveness detector is especially trained for a particular type of fake palm and such knowledge related to the particular type of fake palm is captured via training in its corresponding detection model 530 and used by the detector for liveness assessment. When the detection results from the individual detectors are received at 525, the fake palm detection integrator 540 in the global fake palm detector 560 accesses, at 535, the integration models 550 and generates an integrated detection result by integrating, at 545, all the detection results from the individual detectors for corresponding different types of fake palm. As discussed herein, in some embodiments, the output from each of the individual detectors includes two probabilities $\{P_{i1}, P_{i2}\}$, indicating the likelihood of the input ROI 500 representing a type i fake palm ($P_{i1}$,) and that of the input ROI 500 representing a real palm image ($P_{i2}$). In some embodiments, the integrated detection result may also include two probabilities $\{P_1, P_2\}$, indicating the likelihood of the input ROI 500 representing a fake palm ($P_1$) and that of the input ROI 500 representing a real palm image ($P_2$). In some embodiments, the integrated detection result may be a conclusion as to whether the input ROI is from a fake palm image or not.

Figure 6A:
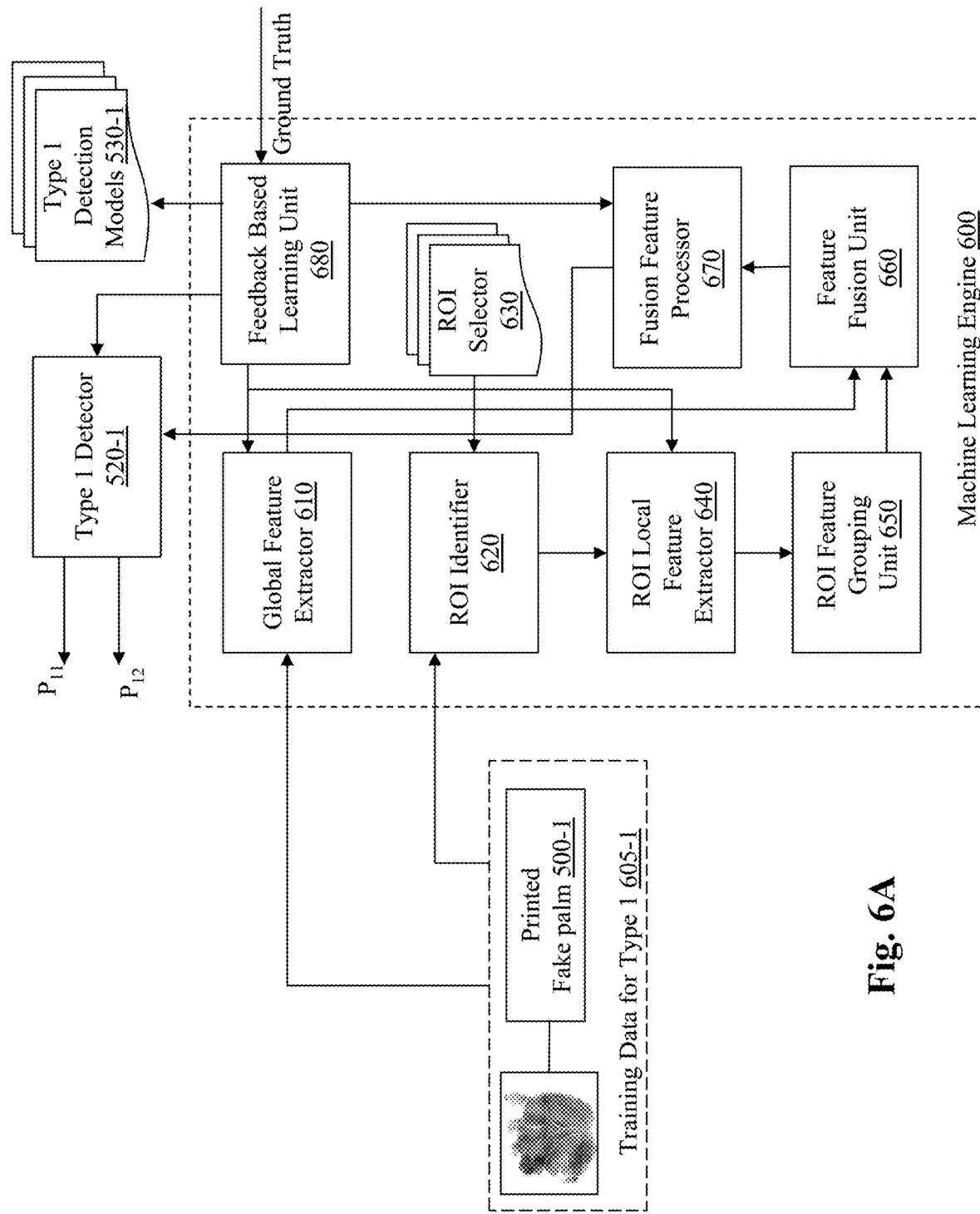
FIG. 6A depicts an exemplary high level system diagram for an example machine learning mechanism for a palm liveness detector directed to a specific type of fake palm, in accordance with an embodiment of the present teaching.

FIG. 6A depicts an exemplary high level system diagram for an example machine learning engine 600 for training detection models for an individual palm liveness detector directed to a specific type of fake palm, in accordance with an embodiment of the present teaching. As discussed herein, as each of the individual detectors 520 is for a specific type of fake palm, the purpose of training is to capture the differences between an actual palm image and an image of that particular type of fake palm in order to use the models subsequently to distinguish an actual palm from that type of fake palm. Therefore, the contrast between an image of an actual palm and that of the type of fake palm is the basis for the models. To enable the learning mechanism to specifically capture the different between the real palm images and images of the type of fake palms, the input to the machine learning engine 600 is pairs 605 of an image of an actual palm and that of a fake palm of the relevant type. The details below are provided with respect to machine learning with respect to type 1 fake palm. It is merely for illustration rather than limitation. The machine learning engines may also be used for learning models for other types of fake palm images.

In FIG. 6A, the machine learning engine 600 comprises an ROI identifier 620, an ROI local feature extractor 640, an ROI feature grouping unit 650, a global feature extractor 610, a feature fusion unit 660, and a feedback based learning unit 680. In this illustrated embodiment, the training data include pairs of actual palm image and fake palm image and each pair may include concatenated actual palm image and the fake palm image. Based on each pair, both local and global features may be extracted. Local features are extracted from ROIs of palms identified from the actual and fake palm images. Global features are extracted from the concatenated pair.

Figure 6B:
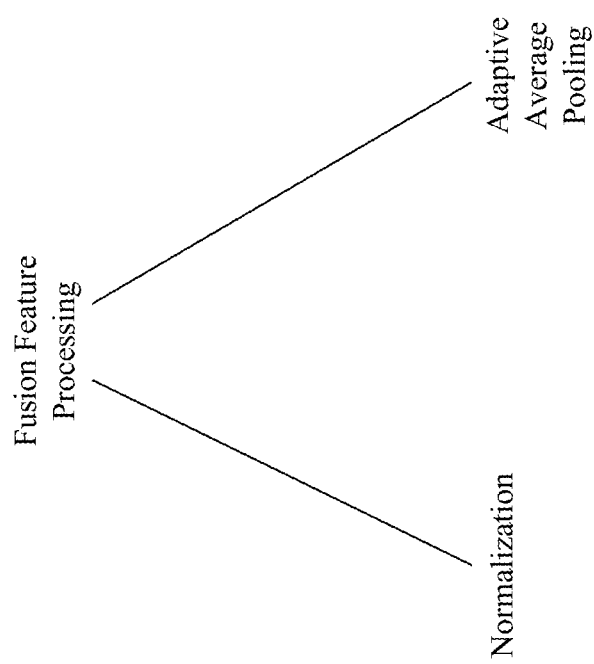
FIG. 6B illustrates exemplary types of postprocessing for fused local and global features, in accordance with an embodiment of the present teaching.

The ROI identifier 620 may be provided to identify more than one ROIs or at different resolution levels on each image. Local features are extracted from each of such identified ROIs and then grouped in a certain manner as will be explained below. Global features and the grouped local features are fused, and the fused features are used for classification by the detector 520-1. In the process of obtaining features (ROIs, local, global, grouping, fusion, and computing the probabilities), various model parameters stored in the detection model 530-1 are used. These model parameters constitute the detection models and are to be learned. Based on the ground truth provided by the training data, the feedback based learning unit 680 detects the discrepancies between the computed probabilities and the ground truth and adjusts the model parameters stored in 530-1 accordingly. The learning is an iterative process, and the model parameters are adjusted to minimize the discrepancies. Optionally, after the local and global features are fused, some post processing may be carried out by a fusion feature processor 670. FIG. 6B illustrates exemplary types of postprocessing for fused features, in accordance with an embodiment of the present teaching. Exemplary types of post processing may include normalization or adaptive average pooling.

Figure 6C:
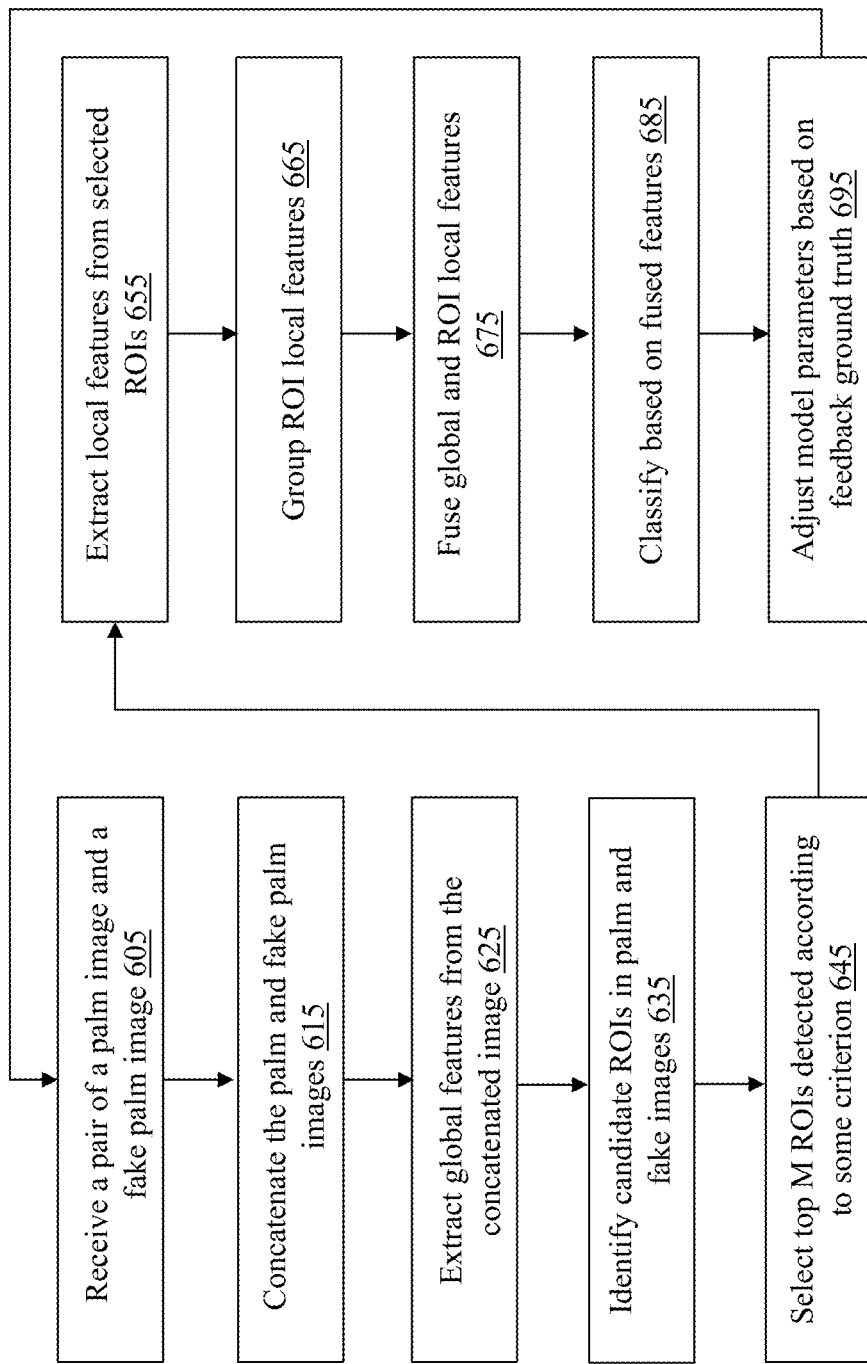
FIG. 6C is a flowchart of an exemplary process for an example machine learning mechanism for a palm liveness detector directed to a specific type of fake palm, in accordance with an embodiment of the present teaching.

FIG. 6C is a flowchart of an exemplary process for the example machine learning engine 600, in accordance with an embodiment of the present teaching. At 605, a pair of actual and fake palm images is received. Based on the pair of images, to extract global features, the global feature extractor 610 concatenates, at 615, the two images and extracts, at 625, global features from the concatenated image. To extract local features, the ROI identifier 620 determines, at 635, multiple candidate ROIs from the images. As discussed herein, in some implementations, multiple ROIs for each image may be identified that are all assessed based on some criterion. For instance, convolutions using certain anchors or kernels created based on palm characteristics may be applied to the image and ROIs may be selected based on responses yielded from the operation. Based on candidate ROIs, top M ROIs may be selected, at 645, for further processing. In some embodiments, the selections may be made based on the responses of convolutions using a certain anchor and convolved at a certain location of the image.

For each of the ROIs selected, the ROI local feature extractor 640 extracts, at 655, local features therefrom. Such extracted local features are then grouped, at 665, by the ROI feature grouping unit 650 and used as local features for fusion by the feature fusion unit 660 at 675. As discussed herein, such fused features may optionally be postprocessed by the fusion feature processor 670. The fused features are then used by the type 1 detector 520-1 to classify at 685. The discrepancies from the ground truth are then used by the feedback based learning unit 680 to adjust, at 695, the model parameters.

Figure 7A:
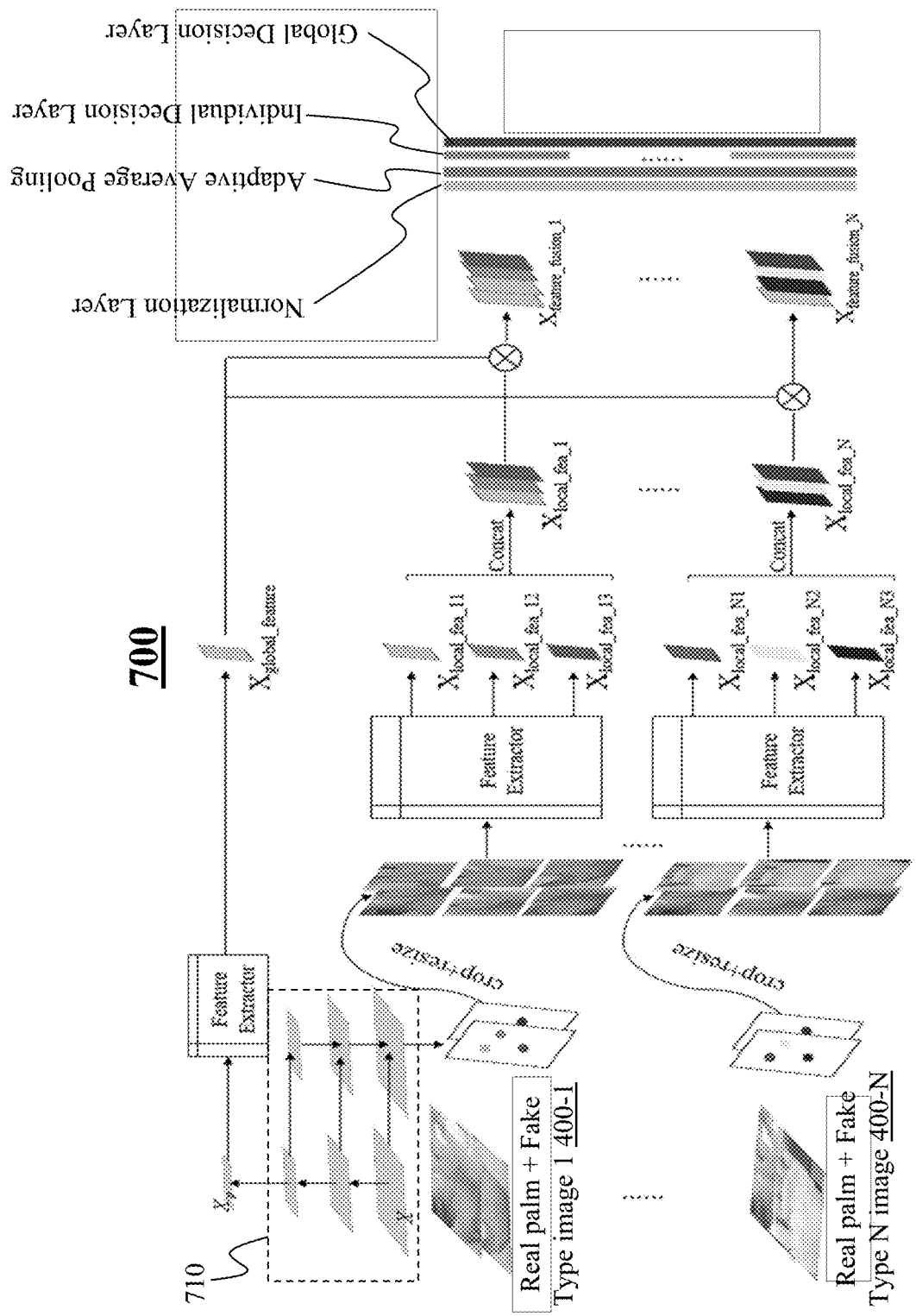
FIG. 7A depicts an exemplary high-level system architecture of a palm liveness detection mechanism implemented in an exemplary artificial neural network, in accordance with an exemplary embodiment of the present teaching.

FIG. 7A depicts an exemplary high-level system architecture of an exemplary palm liveness detection mechanism 700 implemented with a multilayer artificial neural network, in accordance with an exemplary embodiment of the present teaching. In this illustrated embodiment, input images are pairs of images, each of which includes an actual palm image and a fake palm image of a certain type, as shown in FIG. 7A. For each pair, applying a 3×3 convolution processing to each of the two images, yielding respective feature images $X_1 \in \mathfrak{R}^{c \times h \times w}$ and $X_2 \in \mathfrak{R}^{c \times h \times w}$. These two features images obtained from a pair of real and fake palm images are then concatenated to generate a new feature image $X \in \mathfrak{R}^{2c \times h \times w}$. Using feature pyramid network (FPN) with bottom-up and horizontal connection, a global max pooling operation may be performed multiple times (e.g., 3 times), denoted as $f_{gmp}(\cdot)$, and the operation up samples the data points to generate a resulting image $X_p$. As known in the art, a FRN is a feature extractor that takes a single scale image of any size as an input and outputs proportionally sized feature maps at multiple levels, in a fully convolutional fashion. These features are then enhanced with features from the bottom-up pathway via lateral connections. This is shown in box 710 of FIG. 7A. To extract global features $X_{global\_feature}$ from $X_p$, applying a full convolution network, represented by ω, as shown below:

$$X_{global\_feature} = \omega(f_{gmp}(X)) \quad (1)$$

In detecting local features, ROIs may be localized first. In some embodiments, based on $X\_ \in \mathfrak{R}^{2c \times h \times w}$, different ROIs can be identified. For example, down sampling may first be applied to X (connected $X_1$ and $X_2$) to obtain a feature image in its original resolution corresponding to X Based on the image in its original resolution, using region proposal network (RPN) in combination with region of interest align (ROI Align) operations, different ROIs may be identified with each having a different dimension, location, and a response or a confidence score. As known in the art, a RPN is a fully convolutional network that simultaneously predicts object bounds and objectness scores at each position and size of the convolution to provide region proposals. In training the RPN, a large number of palm images may be used for training and via feedback learning so that the trained RPN can be trained to respond appropriately to newly provided images to identify palm regions. The above discussed operations may be formalized as below:

$$x_{roi} = f_{ROIAlign}(X; (h^*, w^*)) \in \mathfrak{R}^{c \times 3 \times 3} \quad (2)$$

where $x_{roi}$ represents an identified ROI, $f_{ROIAlign}(\cdot)$ denotes the ROI Align operation, $(h^*, w^*)$ correspond respectively to the height and width of the ROI. To detecting ROIs, a group of anchors may be used, each of which may correspond to different size and location, covering different possibilities. The responses to each anchor may be recorded and then the ROIs corresponding to certain anchors may be identified based on the responses to the anchors. Some of such identified ROIs may be selected for further processing. For example, top M (e.g., 3) ROIs that have the largest confidence scores may be selected.

In detecting ROIs using RPN, it may be set to use feature image sizes {12×12, 6×6, 4×4} corresponding to original palm regions of sizes {28×28, 56×56, 112×112}, respectively. That is, a 12×12 ROI in a feature image may correspond to a 28×28 ROI in the original palm image and obtained via two 9×9 convolution operations on a 28×28 region in the original palm image; a 6×6 ROI in a feature image may correspond to a 56×56 ROI in the original palm image and obtained via five 11×11 convolution operations on a 56×56 region in the original palm image; a 4×4 ROI in the feature image may correspond to a 112×112 ROI in the original palm image and obtained via nine 13×13 convolution operations on a 112×112 region in the original palm image. For each of the top N ROIs identified via feature images, corresponding image information from the input images of original resolution may be obtained by cropping and resize operations. For instance, according to the respective correspondences between feature image sizes 12×12, 6×6, and 4×4 with original image regions 28×28, 56×56, and 112×112, the corresponding regions in the input image of the original resolution may be identified and cropped and optionally resized (to satisfy required size such as a square) to obtain three ROIs from the input image.

To extract local features from each of such ROI images, FPN may be again applied to the ROI images to extract local features. For instance, for each input image i, M, e.g., 3 sets of features may be obtained, denoted as $X_{local\_fea\_i1}$, $X_{local\_fea\_i2}$, and $X_{local\_fea\_i3}$. To obtain the local features for image i, these 3 sets of features may be concatenated and a 1×1 convolution may be applied to derive the local features $X_{local\_fea\_i}$ for image i, as shown below:

$$X_{local\_fea\_i} = f_{conv}[X_{local\_fea\_i1}, X_{local\_fea\_i2}, X_{local\_fea\_i3}] \quad (3)$$

Upon obtaining both the global and local features for each input image, such features are fused as discussed herein. In some embodiments, the fusion may be implemented as concatenation as shown below:

$$X_{feature\_fusion\_i} = [X_{global\_feature}, X_{local\_fea\_i}] \quad (4)$$

The present teaching describes an approach, as depicted herein, to learn from each pair of real and fake palm by extracting both global features from the grouped pair of images and local features corresponding to different receptive fields so that local features can capture characteristics of the image in different levels of detail. The fused features may be further processed via postprocessing. This may include applying normalization operation at a normalization layer in the network, as shown in FIG. 7A. In addition, the normalized data may also be further processed via an adaptive average pooling layer as depicted in FIG. 7A.

After such postprocessing of the fused features, in the network framework as shown in FIG. 7A, there may be two fully connected networks. The first is an individual decision layer with multiple sub-networks, each of which is for making a decision on whether the input image represents an designated type of fake palm. For instance, the first sub-network (at the top) may be for detecting type 1 fake palm, e.g., generating an output indicating a probability or score on whether the input image is a live palm based on postprocessed $X_{Feature\_fusion\_1}$ via, e.g., SoftMax with respect to type 1 fake palm image. The second sub-network (second from the top) may be for detecting type 2 fake palm, e.g., generating an output indicating a probability or score on whether the input image is a live palm based on postprocessed $X_{Feature\_fusion\_2}$ via, e.g., SoftMax with respect to type 2 fake palm image. The ith sub-network may be for detecting type i fake palm, e.g., generating an output indicating a probability or score on whether the input image is a live palm based on postprocessed $X_{Feature\_fusion\_i}$ via, e.g., SoftMax with respect to type i fake palm image. The Nth sub-network (last one on the bottom) may be for detecting type N fake palm, e.g., generating an output indicating a probability or score on whether the input image is a live palm based on postprocessed $X_{Feature\_fusion\_N}$ via, e.g., SoftMax with respect to type N fake palm image.

In this overall network, consistent with the present teaching described herein, detecting a fake palm is through detecting each individual type of fake palm first. This is done by learning the difference between actual palm images with each individual type of fake palm separately so that finer distinctions may be learned to tell apart a real palm image from each specific type of fake palm image. At the last layer in FIG. 7A, the integration may be designed to make a final decision on liveness in the following manner. If all liveness probabilities from individual sub-networks are all above a certain expected level, e.g., above a threshold (e.g., 0.6 or 60%), then it means that the input image is not detected by any of the sub-network as a specific type of fake palm and in this case, the final decision on the liveness of the input image is affirmative. If any of the sub-network outputs a liveness probability lower than the expected level, it indicates that a specific type of fake palm is likely detected, i.e., the liveness of the input image is not detected. The exemplary implementation of FIG. 7A is consistent with what is depicted in FIG. 5A, where all individual detectors' decisions are integrated at fake palm detection integrator 540.

In network architecture 700, different layers of the network are embedded with various operational parameters, including the weights on network connections as well as parameters used in, e.g., convolutions operations. All such parameters are subject to learning, i.e., their values are adjusted during learning based on, e.g., discrepancies between outputs from the framework 700 (including the final output on whether the liveness and the individual output with respect to each type of fake palm) as well as the ground truth corresponding to the outputs from the training data. Compared with the conventional approach where the distinctions are made between actual palm image and all types of fake palms as a whole, making it more difficult to be sensitive to the fine differences between actual palm images and each different type of fake palm images.

As discussed herein, to improve the reliability of detection under different situations, variations of an input image may also be generated and for each of the variations. As such, the individual detectors directed to specific type of fake palm will process different variations and generate an individual decision on each of the variations. Then the individual decisions for each variation are integrated to come up with a final decision on the liveness of each variation of the input image. Thus, there is another level of integration which is directed to deriving a final liveness decision based on liveness decisions reached based on different variations. As shown in FIG. 4A, for each variation image i of the input image 210, the palm liveness detector 260 outputs a final decision with a, e.g., confidence score $S_i$. Such liveness detection results achieved based on different variations of input image 210 may also be combined by the liveness decision integrator 290 to obtain an overall liveness detection result.

Figure 7B:
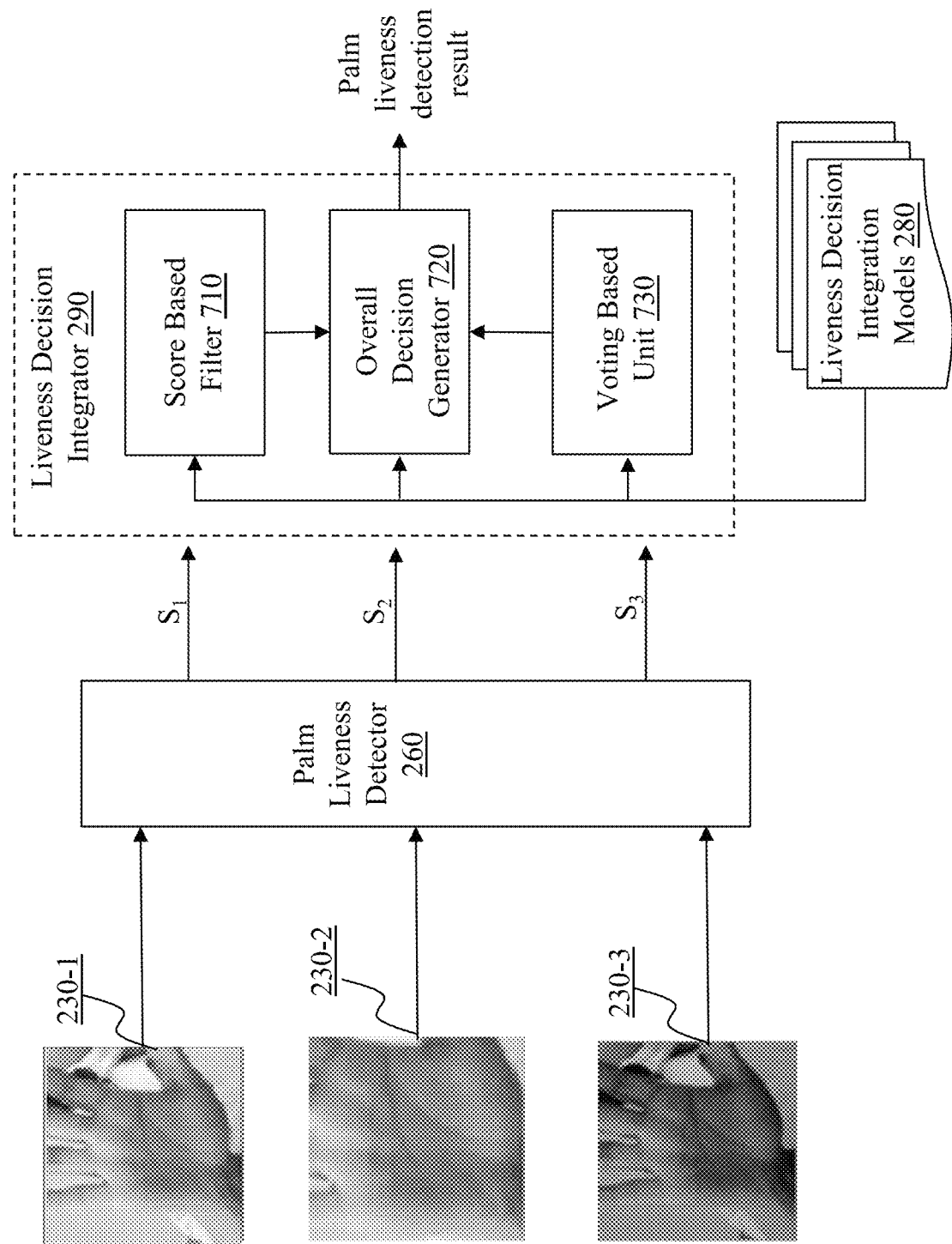
FIG. 7B depicts an exemplary high level system diagram for a palm liveness detection decision integrator for combining liveness decisions on variations of palm images to reach a final liveness detection decision, in accordance with an exemplary embodiment of the present teaching.

FIG. 7B depicts an exemplary high level system diagram for the palm liveness detection decision integrator 290 for combining liveness decisions based on variations of a palm image to reach an overall liveness detection decision, in accordance with an exemplary embodiment of the present teaching. In this embodiment, the input image 210 is used to create three variations, 230-1, 230-2, and 230-3. ROIs detected from these variations are used by the palm liveness detector 260 to assess whether the ROI of each variation represents a fake palm. That is, for the ROIs for the variations, the palm liveness detector 260 yields three final liveness decisions on the liveness of each of the variations. Each of such final decisions may be provided with a confidence score, represented as $S_1$, $S_2$, and $S_3$, representing the confidence in the decision that the palm image in a respective variation represents a live palm. The final liveness decisions on the variations from the palm liveness detector 260 are sent to the liveness decision integrator 290 to combine the decisions derived from different variations to reach a liveness decision on the input image 210.

Figure 7C:
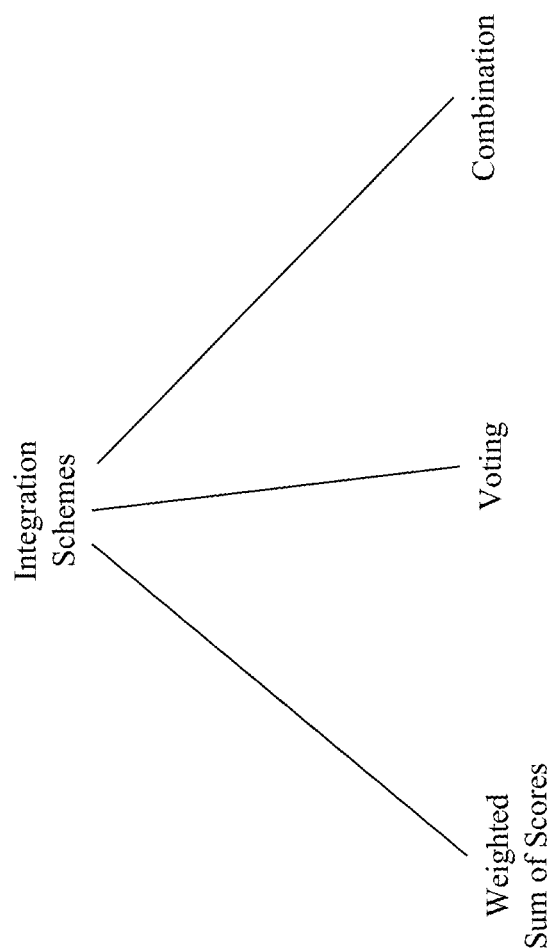
FIG. 7C illustrates exemplary approaches to combine liveness decisions made based on variations of a palm image, in accordance with an embodiment of the present teaching.

The integration may be based on a scheme specified in the liveness decision integration models 280. FIG. 7C illustrates exemplary schemes to be used to combine liveness decisions made based on variations of an input palm image, in accordance with an embodiment of the present teaching. As shown, the combination may be via a weighted, via voting, or a combination of both. In the approach using a weighted score, the combined liveness decision may be made using a weighted sum of the individual scores based on a, e.g., threshold. The weighted score WS may be computed as:

$$WS = \alpha S_1 + \beta S_2 + \gamma S_3$$

where $\alpha$, $\beta$, and $\gamma$ are weights for $S_1$, $S_2$, and $S_3$, respectively, and $\alpha + \beta + \gamma = 1.0$. To determine a combined liveness decision, a threshold T may be used so that if WS>T, the palm in the input image represents a live palm. Otherwise, the palm captured in the input image is fake.

With a voting scheme, a majority vote may be used as a combined decision. That is, each individual score may first be compared with T to determine the variation represents a live palm. If a majority of individual scores indicate that the underlying palm in their variation is a live palm, then the combined decision is that the input image represents a live palm. If there are three variations as shown in the example in FIG. 7B, then the majority is two. Otherwise, the palm in the input image is fake. In a combined scheme to combine, both the weighted score and voting schemes may be applied first as discussed herein. If the combined decision using both schemes is a live palm, then the input image represents a live palm. If the combined decision using both schemes is a fake palm, then the input image represents a fake palm. If a combined decision using one scheme is yes and the other is no, then the combined decision may adopt the liveness decision derived based on the original input image (i.e., ignore the detection results obtained using variations of the original input image).

The liveness decision integrator 290 comprises a score based filter 710, an overall decision generator 720, and a voting based unit 730. The operations of these components are controlled based on configurations specified in the liveness decision integration models 280. For example, the liveness decision integration models 280 may provide various conditions and parameters that are to be used. For example, a threshold on the confidence score on a final liveness decision on a particular variation of palm image may be provided and to be used by the score based filter 710 to filter out a liveness decision from 260 that does not satisfy the threshold requirement. In addition, the liveness decision integration models 280 may also specify how different liveness decisions on variation images may be combined. For example, the weights $\alpha$, $\beta$, and $\gamma$ used in compute the weight score may also be specified. In an alternative, a voting based decision making specification (e.g., what is defined as majority) may also be used to generate a final liveness detection result.

The liveness detection schemes as disclosed herein according to the present teaching overcome the problems of the conventional solutions. The liveness detection is based on a refined understanding of the distinctions between actual and each type of fake palm information makes the detection more reliable. In addition, as the ROIs to be used for detection is created based on natural contextual content from the original image (instead of filling with black pixels), the information in an ROI provides better context and semantics, also leading to more reliable detection. By creating variations of a given input image and detecting liveness based on such variations also makes the detection more robust.

Figure 8:
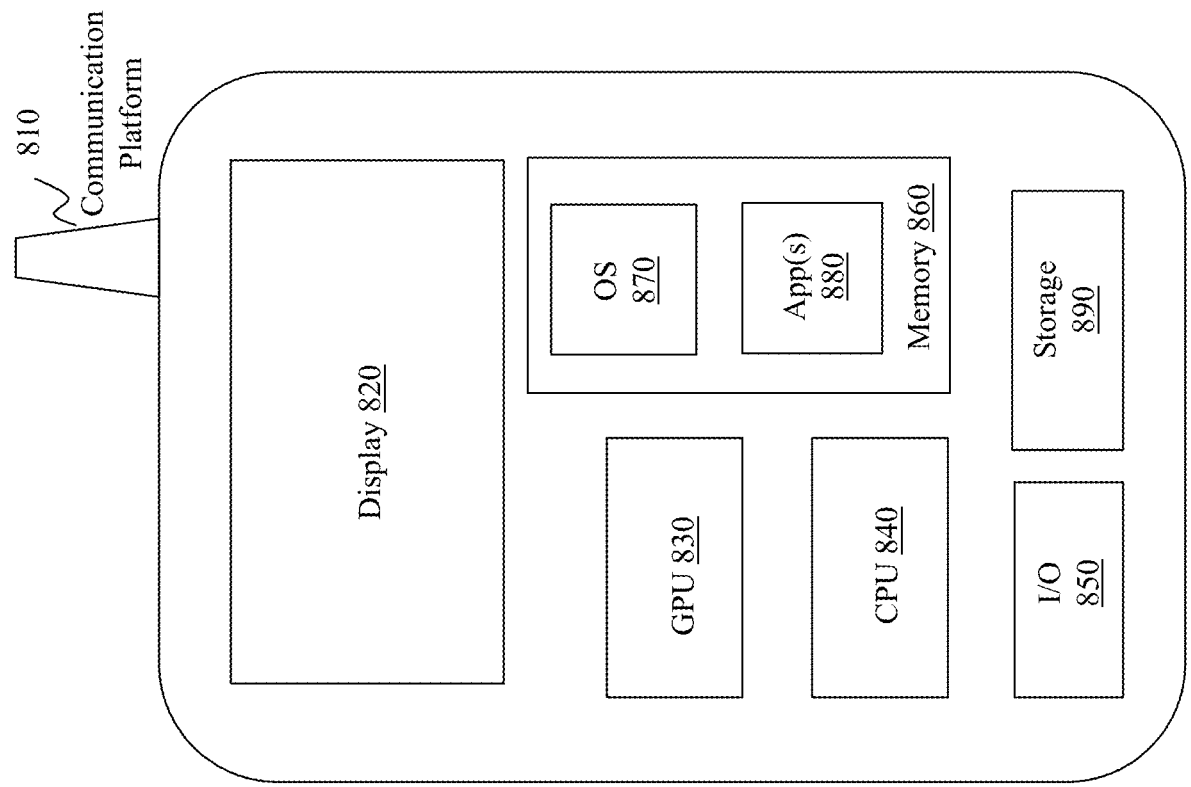
FIG. 8 is an illustrative diagram of an exemplary mobile device architecture that may be used to realize a specialized system implementing the present teaching in accordance with various embodiments.

FIG. 8 is an illustrative diagram of an exemplary mobile device architecture that may be used to realize a specialized system implementing the present teaching in accordance with various embodiments. In this example, the user device on which the present teaching may be implemented corresponds to a mobile device 800, including, but not limited to, a smart phone, a tablet, a music player, a handled gaming console, a global positioning system (GPS) receiver, and a wearable computing device, or in any other form factor. Mobile device 800 may include one or more central processing units ("CPUs") 840, one or more graphic processing units ("GPUs") 830, a display 820, a memory 860, a communication platform 810, such as a wireless communication module, storage 890, and one or more input/output (I/O) devices 850. Any other suitable component, including but not limited to a system bus or a controller (not shown), may also be included in the mobile device 800. As shown in FIG. 8, a mobile operating system 870 (e.g., iOS, Android, Windows Phone, etc.), and one or more applications 880 may be loaded into memory 860 from storage 890 in order to be executed by the CPU 840. The applications 880 may include a user interface or any other suitable mobile apps for information analytics and management according to the present teaching on, at least partially, the mobile device 800. User interactions, if any, may be achieved via the I/O devices 850 and provided to the various components connected via network(s).

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

FIG. 9 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general-purpose computer or a special purpose computer. Both can be used to implement a specialized system for the present teaching. This computer 900 may be used to implement any component or aspect of the framework as disclosed herein. For example, the information analytical and management method and system as disclosed herein may be implemented on a computer such as computer 900, via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 900, for example, includes COM ports 950 connected to and from a network connected thereto to facilitate data communications. Computer 900 also includes a central processing unit (CPU) 920, in the form of one or more processors, for executing program instructions. The exemplary computer platform includes an internal communication bus 910, program storage and data storage of different forms (e.g., disk 970, read only memory (ROM) 930, or random-access memory (RAM) 940), for various data files to be processed and/or communicated by computer 900, as well as possibly program instructions to be executed by CPU 920. Computer 900 also includes an I/O component 960, supporting input/output flows between the computer and other components therein such as user interface elements 980. Computer 900 may also receive programming and data via network communications.

Hence, aspects of the methods of information analytics and management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with information analytics and management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution, e.g., an installation on an existing server. In addition, the techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on at least one processor, a memory, and a communication platform enabling connection to a network for detecting liveness, comprising:
    receiving an image with visual information of a palm;
    identifying a region of interest (ROI) in the image that corresponds to the palm and an initial dimension of the ROI;
    obtaining a plurality of decisions, each of which is made individually on whether the ROI represents a corresponding one of a plurality of types of fake palm; and
    combining the plurality of decisions to derive a liveness detection decision on whether the palm captured in the image corresponds to a live palm.

2. The method of claim 1, wherein
    the image is one of an input image captured by a sensor based on the palm and one or more variations of the input image generated based on the input image; and
    the liveness detection decision is generated with respect to each of the input image and the one or more variations.

3. The method of claim 2, wherein the one or more variations include at least one of:
    a first variation of the input image corresponding to a focused image of a region of the input image;
    a second variation of the input image generated based on the input image with a different lighting condition; and
    a third variation of the input image generated based on the input image with modified intensities.

4. The method of claim 1, further comprising:
    determining that a side of the ROI is outside of the image;
    determining a movement to be made to the ROI to make the ROI inside the image;
    applying the movement to the ROI to generate a moved ROI; and
    outputting the moved ROI as the ROI.

5. The method of claim 1, wherein obtaining the plurality of decisions comprises:
    with respect to each of the plurality types of fake palm,
        invoke a corresponding one of a plurality of fake palm detectors provided for detecting the type of fake palm,
        accessing a detection model previously trained via machine learning to detect the type of fake palm from visual data, and
        deriving, by the fake palm detector in accordance with the detection model, a decision on whether visual data in the ROI represents the type of fake palm; and
    outputting the plurality of decisions with regard to whether the ROI represents the corresponding plurality of fake palm.

6. The method of claim 5, wherein the detection model for each of the plurality types of fake palm is trained based on training data including the type of fake palm, wherein the training data include a plurality of pairs of an actual palm image and a fake palm image of the specific type, wherein the training comprises:

for each of the plurality of pairs,
concatenating the actual palm image and the fake palm image to create a concatenated image,
extracting global features from the concatenated image,
identifying ROIs in the palm and fake palm images,
extracting local features from the ROIs respectively,
grouping the local features from the ROIs,
fusing the global features and grouped local features,
classifying with respect to the specific type of fake palm based on the fused features,
receiving ground truth associated with the pair, and
adjusting parameters of the detection model based on the classification and the ground truth.

7. The method of claim 1, wherein combining the plurality of decisions is performed based on an integration model, obtained via machine learning.

8. The method of claim 1, further comprising:
determining that the initial dimension does not satisfy a specified dimension according to a specification;
determining an expansion dimension of at least one expansion region in one or more directions extending from the ROI to meet the specified dimension;
extending the ROI in the one or more directions by the expansion dimension from the at least one expansion region; and
modifying the ROI using the visual information from the image in the ROI.

9. Machine readable and non-transitory medium having information recorded thereon for detecting liveness, wherein the information, when read by the machine, causes the machine to perform:
receiving an image with visual information of a palm;
identifying a region of interest (ROI) in the image that corresponds to the palm and an initial dimension of the ROI;
obtaining a plurality of decisions, each of which is made individually on whether the ROI represents a corresponding one of a plurality of types of fake palm; and
combining the plurality of decisions to derive a liveness detection decision on whether the palm captured in the image corresponds to a live palm.

10. The medium of claim 9, wherein
the image is one of an input image captured by a sensor based on the palm and one or more variations of the input image generated based on the input image; and
the liveness detection decision is generated with respect to each of the input image and the one or more variations.

11. The medium of claim 10, wherein the one or more variations include at least one of:
a first variation of the input image corresponding to a focused image of a region of the input image;
a second variation of the input image generated based on the input image with a different lighting condition; and
a third variation of the input image generated based on the input image with modified intensities.

12. The medium of claim 9, wherein the information, when read by the machine, further causes the machine to perform:
determining that a side of the ROI is outside of the image;
determining a movement to be made to the ROI to make the ROI inside the image;
applying the movement to the ROI to generate a moved ROI; and
outputting the moved ROI as the ROI.

13. The medium of claim 9, wherein obtaining the plurality of decisions comprises:
with respect to each of the plurality types of fake palm,
invoke a corresponding one of a plurality of fake palm detectors provided for detecting the type of fake palm,
accessing a detection model previously trained via machine learning to detect the type of fake palm from visual data, and
deriving, by the fake palm detector in accordance with the detection model, a decision on whether visual data in the ROI represents the type of fake palm; and
outputting the plurality of decisions with regard to whether the ROI represents the corresponding plurality of fake palm.

14. The medium of claim 13, wherein the detection model for each of the plurality types of fake palm is trained based on training data including the type of fake palm, wherein the training data include a plurality of pairs of an actual palm image and a fake palm image of the specific type, wherein the training comprises:

for each of the plurality of pairs,
concatenating the actual palm image and the fake palm image to create a concatenated image,
extracting global features from the concatenated image,
identifying ROIs in the palm and fake palm images,
extracting local features from the ROIs respectively,
grouping the local features for different ROIs,
fusing the global features and grouped local features,
classifying with respect to the specific type of fake palm based on the fused features,
receiving ground truth associated with the pair, and
adjusting parameters of the detection model based on the classification and the ground truth.

15. The medium of claim 9, wherein combining the plurality of decisions is performed based on an integration model, obtained via machine learning.

16. The medium of claim 9, wherein the information, when read by the machine, further causes the machine to perform:
determining that the initial dimension does not satisfy a specified dimension according to a specification;
determining an expansion dimension of at least one expansion region in one or more directions extending from the ROI to meet the specified dimension;
extending the ROI in the one or more directions by the expansion dimension from the at least one expansion region; and
modifying the ROI using the visual information from the image in the ROI.

17. A system for detecting liveness, comprising:
a palm ROI detector implemented by a processor and configured for
receiving an image with visual information of a palm, and
identifying a region of interest (ROI) in the image that corresponds to the palm and an initial dimension of the ROI; and
a palm liveness detector implemented by the processor and configured for:
obtaining a plurality of decisions, each of which is made individually on whether the ROI represents a corresponding one of a plurality of types of fake palm, and
combining the plurality of decisions to derive a liveness detection decision on whether the palm captured in the image corresponds to a live palm.

18. The system of claim 17, wherein
the image is one of an input image captured by a sensor based on the palm and one or more variations of the input image generated based on the input image; and
the liveness detection decision is generated with respect to each of the input image and the one or more variations.

19. The system of claim 18, wherein the one or more variations include at least one of:
a first variation of the input image corresponding to a focused image of a region of the input image;
a second variation of the input image generated based on the input image with a different lighting condition; and
a third variation of the input image generated based on the input image with modified intensities.

20. The system of claim 17, wherein the palm ROI detector is further configured for:
determining that a side of the ROI is outside of the image;
determining a movement to be made to the ROI to make the ROI inside the image;
applying the movement to the ROI to generate a moved ROI; and
outputting the moved ROI as the ROI.

21. The system of claim 17, wherein the palm liveness detector obtains the plurality of decisions by:
with respect to each of the plurality types of fake palm,
invoking a corresponding one of a plurality of fake palm detectors provided for detecting the type of fake palm,
accessing a detection model previously trained via machine learning to detect the type of fake palm from visual data, and
receiving, from the fake palm detector, a decision in accordance with the detection model on whether visual data in the ROI represents the type of fake palm; and
outputting the plurality of decisions with regard to whether the ROI represents the corresponding plurality of fake palm.

22. The system of claim 21, wherein the detection model for each of the plurality types of fake palm is trained based on training data including the type of fake palm, wherein the training data include a plurality of pairs of an actual palm image and a fake palm image of the specific type, wherein the training comprises:
for each of the plurality of pairs,
concatenating the actual palm image and the fake palm image to create a concatenated image,
extracting global features from the concatenated image,
identifying ROIs in the palm and fake palm images,
extracting local features from the ROIs respectively,
grouping the local features for different ROIs,
fusing the global features and grouped local features,
classifying with respect to the specific type of fake palm based on the fused features,
receiving ground truth associated with the pair, and
adjusting parameters of the detection model based on the classification and the ground truth.

23. The system of claim 17, wherein combining the plurality of decisions is performed based on an integration model, obtained via machine learning.

24. The system of claim 17, wherein the palm ROI detector is further configured for:
determining that the initial dimension does not satisfy a specified dimension according to a specification;
determining an expansion dimension of at least one expansion region in one or more directions extending from the ROI to meet the specified dimension;
extending the ROI in the one or more directions by the expansion dimension from the at least one expansion region; and
modifying the ROI using the visual information from the image in the ROI.

* * * * *